(12) United States Patent
Camargo et al.

(10) Patent No.: US 11,921,250 B2
(45) Date of Patent: Mar. 5, 2024

(54) GEO-MECHANICAL BASED DETERMINATION OF SWEET SPOT INTERVALS FOR HYDRAULIC FRACTURING STIMULATION

(71) Applicant: Saudi Arabian Oil Company, Dhahran (SA)

(72) Inventors: Otto Meza Camargo, Dhahran (SA); Waheed Syed Arshad, Dhahran (SA); Karla Olvera Carranza, Dhahran (SA); Ivan Deshenenkov, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/690,484

(22) Filed: Mar. 9, 2022

(65) Prior Publication Data
US 2023/0288598 A1    Sep. 14, 2023

(51) Int. Cl.
*G01V 1/50*    (2006.01)

(52) U.S. Cl.
CPC ........ *G01V 1/50* (2013.01); *G01V 2210/6163* (2013.01); *G01V 2210/646* (2013.01)

(58) Field of Classification Search
CPC ............. G01V 1/50; G01V 2210/6163; G01V 2210/646
See application file for complete search history.

(56) References Cited

U.S. PATENT DOCUMENTS

| | | | |
|---|---|---|---|
| 6,502,037 B1 | 12/2002 | Jorgensen et al. | |
| 6,705,398 B2 | 3/2004 | Weng | |
| 6,904,365 B2 | 6/2005 | Bratton et al. | |
| 7,025,138 B2 | 4/2006 | Kurkjian et al. | |
| 7,042,802 B2 | 5/2006 | Sinha | |
| 7,337,660 B2 | 3/2008 | Ibrahim et al. | |
| 7,457,194 B2 | 11/2008 | Prioul et al. | |

(Continued)

FOREIGN PATENT DOCUMENTS

| | | |
|---|---|---|
| AU | 2013374225 B2 | 7/2014 |
| AU | 2018267575 B9 | 12/2018 |

(Continued)

OTHER PUBLICATIONS

Alcantara, Ricardo et al.; "A Dynamic Characterization Approach for a Complex Naturally Fractured Reservoir" International Petroleum Technology Conference, Beijing, China, Mar. 26-28, 2019; pp. 1-40.

(Continued)

*Primary Examiner* — Mischita L Henson
(74) *Attorney, Agent, or Firm* — Bracewell LLP; Constance G. Rhebergen; Brian H. Tompkins

(57) ABSTRACT

A process for the determining of sweet spot intervals based on a combination of rock quality, an in-situ stress regime, natural fractures, and the identification of fluid flow paths from the interaction of hydraulic fracturing and formation attributes. The process may include determining geological components, determining mechanical earth model outputs, and determining sweet spot intervals using additional data from fracture calibration tests. Systems and computer-readable media for the determining of sweet spot intervals are also provided.

19 Claims, 16 Drawing Sheets
(4 of 16 Drawing Sheet(s) Filed in Color)

(56) References Cited

U.S. PATENT DOCUMENTS

| | | |
|---|---|---|
| 7,526,385 B2 | 4/2009 | Sayers |
| 7,565,278 B2 | 7/2009 | Li et al. |
| 7,679,993 B2 | 3/2010 | Sayers |
| 7,707,018 B2 | 4/2010 | Shaw |
| 7,941,307 B2 | 5/2011 | Symington et al. |
| 8,010,294 B2 | 8/2011 | Dorn et al. |
| 8,024,124 B2 | 9/2011 | Sayers |
| 8,041,510 B2 | 10/2011 | Dasgupta |
| 8,078,405 B2 | 12/2011 | Delorme |
| 8,121,792 B2 | 2/2012 | Hsu et al. |
| 8,204,727 B2 | 6/2012 | Dean et al. |
| 8,301,427 B2 | 10/2012 | Souche et al. |
| 8,374,836 B2 | 2/2013 | Yogeswaren |
| 8,619,500 B2 | 12/2013 | Gray |
| 8,756,016 B2 | 6/2014 | Tabanou et al. |
| 8,780,671 B2 | 7/2014 | Sayers |
| 8,898,046 B2 | 11/2014 | Moos et al. |
| 9,022,140 B2 | 5/2015 | Marx et al. |
| 9,062,545 B2 | 6/2015 | Roberts et al. |
| 9,063,251 B2 | 6/2015 | Moos |
| 9,110,190 B2 | 8/2015 | Yogeswaren |
| 9,152,745 B2 | 10/2015 | Glinsky |
| 9,305,121 B2 | 4/2016 | Yao et al. |
| 9,390,204 B2 | 7/2016 | Bowen et al. |
| 9,417,348 B2 | 8/2016 | Lin |
| 9,435,192 B2 | 9/2016 | Lawrence et al. |
| 9,465,140 B2 | 10/2016 | Crawford et al. |
| 9,618,652 B2 | 4/2017 | Weng et al. |
| 9,677,393 B2 | 6/2017 | Morris |
| 9,846,260 B2 | 12/2017 | Mallet |
| 9,988,895 B2 | 6/2018 | Roussel et al. |
| 10,001,003 B2 | 6/2018 | Dusseault et al. |
| 10,101,498 B2 | 10/2018 | Berard et al. |
| 10,302,785 B2 | 5/2019 | Dirksen et al. |
| 10,310,137 B1 | 6/2019 | Mallet |
| 10,352,145 B2 | 7/2019 | Maxwell et al. |
| 10,422,208 B2 | 9/2019 | Weng et al. |
| 10,465,509 B2 | 11/2019 | Yao et al. |
| 10,528,681 B2 | 1/2020 | Yogeswaren |
| 10,563,493 B2 | 2/2020 | Ganguly et al. |
| 10,571,605 B2 | 2/2020 | Crawford et al. |
| 10,572,611 B2 | 2/2020 | Huang et al. |
| 10,607,043 B2 | 3/2020 | Camargo et al. |
| 10,724,346 B2 | 7/2020 | Eftekhari Far et al. |
| 10,760,416 B2 | 9/2020 | Weng et al. |
| 10,787,887 B2 | 9/2020 | Pankaj et al. |
| 10,920,538 B2 | 2/2021 | Rodriguez Herrera et al. |
| 10,920,552 B2 | 2/2021 | Rodriguez Herrera et al. |
| 11,098,582 B1 | 8/2021 | Camargo et al. |
| 11,180,975 B2 | 11/2021 | Renaudeau et al. |
| 11,313,994 B2 | 4/2022 | Salman et al. |
| 11,599,790 B2 | 3/2023 | Pandey et al. |
| 2007/0100594 A1 | 5/2007 | Lamoureux-Var et al. |
| 2007/0255545 A1 | 11/2007 | Pita et al. |
| 2007/0272407 A1 | 11/2007 | Lehnman et al. |
| 2008/0071505 A1 | 3/2008 | Huang et al. |
| 2009/0032250 A1 | 2/2009 | Sarkar et al. |
| 2009/0319243 A1 | 12/2009 | Suarez-Rivera et al. |
| 2010/0191470 A1 | 7/2010 | Tabanou et al. |
| 2010/0250216 A1 | 9/2010 | Narr et al. |
| 2012/0072188 A1 | 3/2012 | Maerten et al. |
| 2013/0046524 A1 | 2/2013 | Gathogo et al. |
| 2013/0297269 A1 | 11/2013 | Davies et al. |
| 2013/0299241 A1 | 11/2013 | Alberty et al. |
| 2014/0358510 A1 | 12/2014 | Sarkar et al. |
| 2015/0129211 A1 | 5/2015 | Dusseault et al. |
| 2015/0276979 A1 | 10/2015 | Hugot et al. |
| 2016/0222765 A1 | 8/2016 | Nooruddin et al. |
| 2016/0266274 A1 | 9/2016 | Alqam et al. |
| 2016/0266278 A1 | 9/2016 | Holderby et al. |
| 2016/0281498 A1 | 9/2016 | Nguyen et al. |
| 2017/0051598 A1 | 2/2017 | Ouenes |
| 2017/0132339 A1 | 5/2017 | Umholtz et al. |
| 2017/0145793 A1 | 5/2017 | Ouenes |
| 2017/0176228 A1 | 6/2017 | Elisabeth |
| 2017/0205531 A1 | 7/2017 | Berard et al. |
| 2017/0254909 A1 | 9/2017 | Agharazi |
| 2017/0316128 A1 | 11/2017 | Huang et al. |
| 2018/0203146 A1 | 7/2018 | Den Boer et al. |
| 2019/0080122 A1 | 3/2019 | Camargo et al. |
| 2019/0345815 A1 | 11/2019 | Mishra |
| 2020/0056460 A1* | 2/2020 | Isaev ................... G06F 30/00 |
| 2020/0095858 A1 | 3/2020 | Bouaouaja et al. |
| 2020/0225382 A1 | 7/2020 | Mallet et al. |
| 2020/0225383 A1 | 7/2020 | Mallet et al. |
| 2020/0326322 A1 | 10/2020 | Farrukh Hamza |
| 2021/0054736 A1 | 2/2021 | Moos et al. |
| 2021/0102461 A1 | 4/2021 | Kumar et al. |
| 2021/0132246 A1 | 5/2021 | Liu et al. |
| 2021/0140313 A1 | 5/2021 | Busetti |
| 2021/0222518 A1 | 7/2021 | Bardy et al. |
| 2021/0350052 A1 | 11/2021 | Alwahtani et al. |
| 2022/0018245 A1 | 1/2022 | Coenen |
| 2023/0084141 A1* | 3/2023 | Camargo ............ G01V 99/005 |

FOREIGN PATENT DOCUMENTS

| | | |
|---|---|---|
| CA | 2904008 A1 | 9/2014 |
| CA | 2932670 A1 | 12/2017 |
| CA | 3043231 A1 | 6/2018 |
| CN | 102788994 B | 1/2015 |
| CN | 104459775 B | 3/2015 |
| CN | 104500050 A | 5/2015 |
| CN | 105403929 A | 3/2016 |
| CN | 105484741 A | 4/2016 |
| CN | 103064114 B | 5/2016 |
| CN | 106285659 A | 1/2017 |
| CN | 104992468 B | 1/2018 |
| CN | 105134156 B | 5/2018 |
| CN | 108331555 A | 7/2018 |
| CN | 110850057 B | 4/2021 |
| CN | 112253103 B | 8/2021 |
| CN | 112065351 B | 9/2021 |
| CN | 113534291 A | 10/2021 |
| CN | 109102180 B | 11/2021 |
| CN | 112526107 B | 11/2021 |
| CN | 109388817 B | 2/2022 |
| CN | 114153002 A | 3/2022 |
| EP | 3118758 A1 | 1/2017 |
| EP | 2179134 B1 | 1/2018 |
| EP | 3074957 B1 | 2/2022 |
| FR | 2979016 A | 2/2013 |
| KR | 101620506 B1 | 5/2016 |
| KR | 102111207 B1 | 5/2020 |
| RU | 2404359 C2 | 11/2010 |
| WO | 2010111398 A2 | 9/2010 |
| WO | 2013169256 A1 | 11/2013 |
| WO | 2015168417 A1 | 11/2015 |
| WO | 2016122792 A1 | 8/2016 |
| WO | 2016209822 A1 | 12/2016 |
| WO | 2017019388 A1 | 2/2017 |
| WO | 2020167282 A1 | 8/2020 |
| WO | 2020198210 A1 | 10/2020 |
| WO | 2021108439 A1 | 6/2021 |
| WO | 2021236877 A1 | 11/2021 |
| WO | 2023130074 A1 | 7/2023 |

OTHER PUBLICATIONS

ArcGIS; "How Line Density works" available as of Jan. 18, 2022 at: https://desktop_arcgis.com/en/arcmap/10.6/tools/spatial-analyst-toolbox/how-line-density-works.htm; pp. 1-3.

ArcGIS Pro 2.8; "An overview of the Density toolset" available as of Apr. 4, 2022 at: https://pro.arcgis.com/en/pro-app/2.8/tool-reference/spatial-analyst/an-overview of-the-density-tools.htm; p. 1.

ArcGIS Pro 2.8; "How Kernel Density Works" Available as of Mar. 14, 2022 at: https://pro.arcgis.com/en/pro-app/2.8/tool-reference/spatial-analyst/how-kernel-density-works.htm; pp. 1-6.

ArcGIS Pro 2.8; "Kernel Density (Spatial Analyst)" available as of Mar. 14, 2022 at: https://pro.arcgis.com/en/pro-app/2.8/tool-reference/spatial-analyst/kernel-density.htm; pp. 1-5.

(56) References Cited

OTHER PUBLICATIONS

ArcGIS Pro 2.8; "Line Density (Spatial Analyst)" available as of Apr. 4, 2022 at: https://pro.arcgis.com/en/pro-app/2.8/tool-reference/spatial-analyst/line-density.htm; pp. 1-6.

ArcGIS Pro 2.8; "Point Density (Spatial Analyst)" available as of Apr. 4, 2022 at: https://pro.arcgis.com/en/pro-app/2.8/tool-reference/spatial-analyst/point-density.htm; pp. 1-7.

Jiang, Le et al.; "Simulation and Optimization of Dynamic Fracture Parameters for an Inverted Square Nine-Spot Well Pattern in Tight Fractured Oil Reservoirs" Hindawi, Geofluids, vol. 2020, Article ID 8883803; pp. 1-9.

Liu, Shiqi et al.; "Geological and Engineering Integrated Shale Gas Sweet Spots Evaluation Based on Fuzzy Comprehensive Evaluation Method: A Case Study of Z Shale Gas Field HB Block" Energies 2022, 15, 602, Jan. 14, 2022; pp. 1-20.

Ouenes, Ahmed; "Stress Modeling '3-G' Workflow Pinpoints Shale Sweet Spots" The American Oil & Gas Reporter, Jul. 2015; pp. 1-3.

U.S. Appl. No. 17/712,820 titled "System and Method to Develop Naturally Fractured Hydrocarbon Reservoirs Using a Fracture Density Index", filed Apr. 4, 2022.

U.S. Appl. No. 17/721,064 titled "Identifying Naturally Fractured Sweet Spots Using a Fracture Density Index (FDI)", filed Apr. 14, 2022.

Wikipedia; "Kernel density estimation" available as of Apr. 4, 2022 at: https://en.wikipedia.org/wiki/Kernel_density_estimation#:~:text= In statistics%2C kernel density estimation,on a finite data sample; pp. 1-12.

Ahmadi, Mohammad Ali; "Toward Reliable Model for Prediction Drilling Fluid Density at Wellbore Conditions: A LSSVM Model" Department of Petroleum Engineering, Ahwaz Faculty of Petroleum Engineering; pp. 1-34.

Aksenov, A.A. et al.; "Prediction of Distribution of Hydrogen Sulfide in Oil-Gas Basins" Petroleum Geology: A digest of Russian literature on Petroleum Geology; vol. 16 (1979), No. 10 (October); pp. 439-441.

Al-Hawas, Khalid et al.; Delineation of fracture anisotropy signatures in Wudayhi Field by azimuthal seismic data; The Leading Edge, Interpreter's Corner, Dec. 2003; pp. 1202-1211.

Al-Nutaifi et al.; "Wellbore Instability Analysis for Highly Fractured Carbonate Gas Reservoir from Geomechanics Prospective, Saudi Arabia Case Study" International Petroleum Technology Conference, Kuala Lumpur, Malaysia, Dec. 10-12, 2014; pp. 1-10.

Aldrich, Jeffrey B. et al.; "'Sweet Spot' Identification and Optimization in Unconventional Reservoirs" Search and Discovery Article #80644 (2018); pp. 1-6.

ArcGIS; "How Kernel Density works" available as of Jan. 28, 2022 at: https://desktop.arcgis.com/en/arcmap/10.6/tools/spatial-analyst-toolbox/how-kernel-density-works.htm; pp. 1-3.

Barree, R.D. et al.; "Holistic Fracture Diagnostics" SPE 107877, Rocky Mountain Oil & Gas Technology Symposium, Denver, CO, Apr. 16-18, 2007; pp. 1-13.

Barton, Colleen A. et al.; "Fluid flow along potentially actuve faults in crystalline rock" Geology, Aug. 1995; v. 23; No. 8; pp. 683-686.

Bisdom, Kevin et al.; "A geometrically based method for predicting stress-induced fracture aperture and flow in discrete fracture networks" AAPG Bulletin v. 100, No. 7 (Jul. 2016); pp. 1075-1097.

Bisdom, Kevin et al.; "The impact of in-situ stress and outcrop-based fracture geometry on hydraulic aperture and upscaled permeability in fractured reservoirs" (abstract only) Tectonphysics v. 690, Part A, Oct. 28, 2010; pp. 63-75.

Camargo, Otto E. Meza et al.; "Reservoir Stress Path from 4D Coupled High Resolution Geomechanics Model: A Case Study for Jauf Formation, North Ghawar, Saudi Arabia" Saudi Aramco Journal of Technology, Fall 2016; pp. 45-59.

Cao, Yang-Bing et al.; "Calculation Method and Distribution Characteristics of Fracture Hydraulic Aperture from Field Experiments in Fractured Granite Area" (abstract only), Springer Ling, Nov. 9, 2015; pp. 1-18.

Cappa, F. et al.; "Estimation of fracture flow parameters through numerical analysis of hydromechanical pressure pulses" Water Resources Research, American Geophysical Union, 2008, 44, pp. W11408; pp. 1-49.

Chen, Sheng et al.; "Prediction of sweet spots in shale reservoir based on geophysical well logging and 3D seismic data" Energy Exploration & Exploitation, vol. 35(2), 2017; pp. 147-171.

Engelder, Terry et al.; "Chapter 15: A Pore-Pressure Limit in Overpressured South Texas Oil and Gas Fields" pp. 255-267, AAPG Memoir 67, 1997; pp. 255-267.

Fischer, K. et al.; "A workflow for building and calibrating 3-D geomechoanical models—a case study for a gas reservoir in the North German Basin" Solid Earth, 4, (2013); pp. 347-355.

Gan, Quan et al.; "A continuum model for coupled stress and fluid flow in discrete fracture networks" Geomech. Geophys. Geo-energ. Geo-resour. (2016); pp. 2:43-61.

Gray, F. David et al.; "Fracture detection in the Manderson Field: A 3D AVAZ case history" Society of Exploration Geophysicists, Jan. 5, 2005; pp. 1-4.

Herwanger, J., Seismic Geomechanics, How to Build and Calibrate Geomechanical Models using 3D and 4D Seismic Data, 1 Edn., EAGE Publications b.v. Houten, 2011; Chapter 2, pp. 19-39, Chapter 6, pp. 102-118.

International Search Report and Written Opinion for International Application No. PCT/US2018/046824 dated Nov. 28, 2018; pp. 1-13.

International Search Report and Written Opinion for International Application No. PCT/US2020/062069, dated Mar. 11, 2021; pp. 1-18.

International Search Report and Written Opinion for International Application No. PCT/US2021/018379 dated May 28, 2021; pp. 1-16.

Jorgensen, Bo Barker et al.; "Bacterial Sulfate Reduction Above 100C in Deep-Sea Hydrothermal Vent Sediments" (Abstract only) Science, vol. 258, Issue 5089, Dec. 11, 1992; pp. 1756-1757.

Khadivi, Kourosh et al.; "Integrated fracture characterization of Asmari reservoir in Haftkel field" Journal of Petroleum Exploration and Production Technology, Jan. 4, 2022; pp. 1-21.

Koutsabeloulis, N.C. et al.; "Numerical geomechanics in reservoir engineering" Computer Methods and Advances in Geomechanics, A.A. Balkema, Rotterdam, The Netherlands, 1994; pp. 2097-2104.

Lei, Qinghua et al.; "The use of discrete fracture networks for modelling coupled geomechanical and hydrological behaviour of fracture rocks" Computers and Geotechnics 85 (2017); pp. 151-176.

Liu, Naizhen et al.; "Shale gas sweet spot identification and precise geo-steering drilling in Weiyuan Block of Sichuan Basin, SW China" Petroleum Exploration and Development, vol. 43, Issue 6, Dec. 2016; pp. 1-9.

Luthi, S.M. et al.; "Fracture apertures from electrical borehole scans" Geophysics, vol. 55, No. 7 (Jul. 1990); pp. 821-833.

Maerten, F.; "Adaptive cross-approximation applied to the solution of system of equations and post-Processing for BD elastostatic problems using the boundary element Method" Engineering Analysis with Boundary Elements 34, 2010; pp. 483-491.

Matyasik, Irena et al.; "Genesis of hydrogen sulfide in carbonate reservoirs" NAFTA-GAZ, ROK LXXIV, Nr Sep. 2018; pp. 627-635.

Min, Ki-Bok et al.; "Stress-Dependent Permeability of Fractured Rock Masses: A Numerical Study" International Journal of Rock Mechanics and Mining Sciences, vol. 41, Issue 7, 2004; pp. 1191-1210.

Nejadi, Siavash et al.; "History matching and uncertainty quantification of discrete fracture network models in fractured reservoirs" Journal of Petroleum Science and Engineering 152 (2017); pp. 21-32.

Orr, Wilson L.; "Changes in Sulfur Content and Isotopic Ratios of Sulfur during Petroleum Maturation—Study of Big Horn Basin Paleozoic Oils" The American Association of Petroleum Geologists Bulletin, V. 58, No. 11 (Nov. 1974); pp. 2295-2318.

Rogers S. et al, "Integrating discrete fracture network models and pressure transient data for testing conceptual fracture models of the Valhall chalk reservoir, Norway North Sea"; Geological Society, London, Special Publications, 270, 2007, pp. 187-197.

(56) References Cited

OTHER PUBLICATIONS

Rogers, Stephen F.; "Critical stress-related permeability in fractured rocks", Chpt 2, Fracture and In-Situ Stress Characterization of Hydrocarbon Reservoirs, (AMEEN) Geoscience World, The Geological Society of London, Jan. 1, 2003; pp. 7-16.
Schlumberger; "Welcome to Techlog online help 2018.2" 2018; pp. 1-2.
Silverman, B.W.; "Density Estimation for Statistics and Data Analysis" Monographs on Statistics and Applied Probability, London: Chapman and Hall, 1986; pp. 1-22.
Sorkhabi, Rasoul, Ph.D.; "Locating Sweet Spots: Shale Petroleum Systems" available as of Dec. 28, 2021 at: https://www.geoexpro.com/articles/2020/06/locating-sweet-spots-shale-petroleum-systems; vol. 17, No. 2—2020; pp. 1-10.
Tokhmchi, Behzad et al.; "Estimation of the fracture density in fractured zones using petrophysical logs" Journal of Petroleum Science and Engineering 72 (2010); pp. 206-213.
U.S. Appl. No. 17/463,153 titled "Determining Hydrogen Sulfide (H2S) Concentration and Distribution in Carbonate Reservoirs Using Geomechanical Properties", filed Aug. 31, 2021.
U.S. Appl. No. 17/476,914 titled "Identifying Fluid Flow Paths in Naturally Fractured Reservoirs", filed Sep. 16, 2021.
Worden, R.H. et al.; "Gas Souring by Thermochemical Sulfate Reduction by 140C1" The American Association of Petroleum Geologists Bulletin, V. 79, No. 6 (Jun. 1995); pp. 854-863.
Worden, Richard H. et al.; "Origin of H2S in Khuff Reservoirs by Thermochemical Sulfate Reduction: Evidence from Fluid Inclusions" Saudi Aramco Journal of Technology, Fall 2004; pp. 42-52.
Zellou, Abdel et al.; "Fractured Reservoir Characterization Using Post-Stack Seismic Attributes: Application to a Hungarian Reservoir", EAGE 68th Conference & Exhibition—Vienna, Austria, Jun. 12-15, 2006; pp. 1-4.
Zhu, GuangYou et al.; "The controlling factors and distribution prediction of H2S formation in marine carbonate gas reservoir, China" (abstract only) Chinese Science Bulletin, vol. 52 (2007), pp. 150-163.
Zoback, Mark D.; "Chapter 11: Critically stressed faults and fluid flow" Reservoir Geomechanics, Cambridge University Press, New York, 2007, pp. 1-21.
Fischer, K. et al.; "Generating and Calibrating 3D Geomechanical Reservoir Models" 75th EAGE Conference and Exhibition incorporating SPE EUROPEC 2013, London UK, Jun. 10-13, 2013; pp. 1-5.
Akhmetova, A.A. et al.; "Evaluation of the applicability minifracturing data to determine reservoir pressure and transmissibility (Russian)." OIJ 2018 (2018); pp. 90-94.
Azari, Mehdi et al.; "Determining the Formation Properties with Innovative Formation Integrity Test Designed Using a Wireline Straddle Packer, A Field Example" SPWLA 59th Annual Logging Symposium, Jun. 2-6, 2018; pp. 1-12.
Blakely, Richard J.; "Potential Theory in Gravity and Magnetic Applications" Cambridge University Press, 1996; pp. 1-9.
Ferreira, Francisco J.F. et al.; "Enhancement of the total horizontal gradient of magnetic anomalies using the tilt angle" Geophysics vol. 78, No. 3 (May-Jun. 2013); pgs. J33-J41.

Friedman, Jerome H.; "Greedy Function Approximation: A Gradient Boosting Machine" 1999 Reitz Lecture, The Annals of Statistics (2001), vol. 29, No. 5; pp. 1189-1232.
Gunn, P.J.; "Linear Transformations of Gravity and Magnetic Fields" Geophysical Prospecting vol. 23, Issue 2, Jun. 1974; pp. 300-312.
Han, Jiahang et al.; "Stress Field Change Due to Reservoir Depletion and Its Impact on Refrac Treatment Design and SRV in Unconventional Reservoirs" SPE-178496-MS/URTeC:2144941; Unconventional Resources Tech. Conf., Texas, Jul. 20-22, 2015; pp. 1-11.
Jacquemyn, Carl et al.; "Mechanical stratigraphy and (paleo-) karstification of the Murge area (Apulia, southern Italy)" (abstract only) Geological Society, London, Special Publications vol. 370; pp. 169-186.
Miller, Hugh G. et al.; "Potential field tilt—a new concept for location of potential field sources" Journal of Applied Geophysics 32 (1994); pp. 213-217.
Mojeddifar, Saeed et al.; "Porosity prediction from seismic inversion of a similarity attribute based on a pseudo-forward equation (PFE): a case study from the North Sea Basin, Netherlands" Pet. Sci. (2015) 12; pp. 428-442.
Nolte, K.G. et al.; "After-Closure Analysis of Fracture Calibration Tests" SPE 38676, 1997 SPE Annual Technical Conference and Exhibition, San Antonio, TX, Oct. 5-8, 1997; pp. 333-349.
Phillips, Jeffrey D.; "Designing matched bandpass and azimuthal filters for the separation of potential-field anomalies by source region and source type" ASEG 15th Geophysical Conference and Exhibition, Aug. 2001, Brisbane; pp. 1-4.
Rezmer-Cooper, Iain M. et al.; "Real-Time Formation Integrity Tests Using Downhole Data" IADC/SPE 59123, 2000 IASC/SPE Drilling Conference, New Orleans, LA, Feb. 23-25, 2000; pp. 1-12.
Schultz, Ryan et al.; "The Cardston Earthquake Swarm and Hydraulic Fracturing of the Exshaw Formation (Alberta Bakken Play)" Bulletin of the Seismological Society of America, vol. 105, No. 6, Dec. 2015; pp. 1-14.
Spector, A. et al.; "Statistical Models for Interpreting Aeromagnetic Data" Geophysics, vol. 35, No. 2, Apr. 1970; pp. 293-302.
Tian, Fei et al.; "Three-Dimensional Geophysical Characterization of Deeply Buried Paleokarst System in the Tahe Oilfield, Tarim Basin, China" Water (2019) 11, 1045; pp. 1-18.
Van Lanen, Xavier et al.; "Integrated geologic and geophysical studies of North American continental intraplate seismicity" The Geological Society of America, Special Paper 425, 2007; pp. 101-112.
Wilson, Adam; "Common Mistakes Associated with Diagnostic Fracture Injection Tests" Journal of Petroleum Technology, Aug. 31, 2014; pp. 1-6.
Wynants-Morel, Nicolas et al.; "Stress Perturbation From Aseismic Slip Drives the Seismic Front During Fluid Injection in a Permeable Fault" JGR Solid Earth vol. 125, Issue 7, Jul. 2020; pp. 1-23.
Shimizu, Hiroyuki et al.; "A study of the effect of brittleness on hydraulic fracture complexity using a flow-coupled discrete element method", Journal of Petroleum Science & Engineering 160 (2018); pp. 372-383.

\* cited by examiner

GEO-MECHANICAL BASED DETERMINATION OF SWEET SPOT INTERVALS FOR HYDRAULIC FRACTURING STIMULATION

BACKGROUND

Field of the Disclosure

The present disclosure generally relates to the production of hydrocarbons from subsurface reservoirs. More specifically, embodiments of the disclosure relate the determination of sweet spot intervals in certain naturally fractured reservoirs.

Description of the Related Art

The extraction of hydrocarbon resources from reservoirs in rock formations may depend on a variety of factors. Some reservoirs may present particular challenges with respect to hydraulic fracturing and identifying suitable intervals for fracturing. For example, naturally fracturing "tight sand" reservoirs may present such challenges. A variety of factors may pose different difficulties in exploitation of naturally fractures tight sand reservoirs via hydraulic fracturing. For example, natural fractures may have a direct impact on the performance of hydraulic fracturing stimulation.

SUMMARY

Extracting hydrocarbons from naturally fractured tight sand reservoirs may include the drilling of horizontal wells and hydraulic fracturing stimulation. As used herein, the term "tight sand" refers to sandstone reservoirs having relatively low permeability, such as greater than 0 millidarcy (mD) but less than 1 mD and, in some instance, greater than 0 mD but less than 0.1 mD. Subsurface factors such as rock quality, in-situ stress distributions, natural fractures, reservoir heterogeneity and well trajectory may not intersect uniformly throughout the entire wellbore and may increase the difficulty in properly exploiting these types of reservoirs. Natural factures may impact fracturing pump rates and may cause formation breakdown pressures that generate near-wellbore tortuosity and create large fluid-flow leak-off situations. Such conditions may compromise hydraulic fracturing stimulation treatments and well productivity.

Consequently, hydraulic fracturing stimulations may be performed on identified "sweet spots" to minimize or avoid the aforementioned problems. As used herein, the term "sweet spot" refers to a desired location for optimizing hydrocarbon production via a particular treatment or operation. Existing techniques for identifying sweet spots for hydraulic fracturing stimulation rely on the evaluation of formation porosity and permeability, as well as parameters such as Poisson's Ratio, Young's Modulus and fracture gradient; however, such techniques are often unable to or mistakenly identify sweet spots and do not provide the optimal conditions for successful hydraulic fracturing stimulations.

Embodiments of the disclosure include systems, methods, and computer readable media for the identification of sweet spot intervals based on a combination of rock quality, the in-situ stress regime, natural fractures, and the creation of fluid flow paths from the interaction of hydraulic fracturing and formation attributes.

In some embodiments, a method for determining a sweet spot for hydraulic fracturing stimulation in a naturally fractured tight sand hydrocarbon reservoir is provided. The method includes obtaining a plurality of measurements from one or more wells accessing the carbonate reservoir, determining reservoir parameters representing properties of the reservoir, and determining a plurality of maximum horizontal stress values. The plurality of maximum horizontal stress values are determined from the reservoir parameters. The method also includes determining a fracability index associated with the reservoir at least one of the reservoir parameters, determining a brittleness index associated with the reservoir using the plurality of maximum horizontal stress values and at least one of the reservoir parameters, and identifying a fluid flow path using a shear stress, a normal stress, and a fracture aperture. The method further includes obtaining fracture injection data from a fracture injection test and determining the sweet spot for hydraulic fracturing stimulation based on the fracability index, the brittleness index, the fluid flow path, and the fracture injection data.

In some embodiments, the reservoir parameters representing properties of the reservoir include dynamic mechanical properties of the rock in the reservoir. In some embodiments, the dynamic mechanical properties include Young's Modulus and Poisson's ratio. In some embodiments, the reservoir parameters representing properties of the reservoir include static mechanical properties of the rock in the reservoir. In some embodiments, identifying a fluid flow path using a shear stress, a normal stress, and an aperture associated of a fracture includes determining the aperture of the fracture in the naturally fractured hydrocarbon reservoir using a resistivity, a drilling fluid resistivity, and an excess current measurement, determining a shear stress associated with the fracture, the shear stress determined from reservoir parameters representing properties of the hydrocarbon reservoir, and determining a normal stress associated with the fracture, the normal stress determined from reservoir parameters representing properties of the hydrocarbon reservoir, and identifying a fluid flow path using the shear stress, the normal stress, and the aperture. In some embodiments, the plurality of measurements include a compressional sonic log, a shear sonic log, and a density log. In some embodiments, the method includes performing a fracture injection test. In some embodiments, the method includes performing a hydraulic fracturing stimulation operation based on the determined sweet spot.

In another embodiment, a non-transitory computer-readable storage medium having executable code stored thereon for determining a sweet spot for hydraulic fracturing stimulation in a naturally fractured tight sand hydrocarbon reservoir. The executable code includes a set of instructions that causes a processor to perform operations that include obtaining a plurality of measurements from one or more wells accessing the carbonate reservoir, determining reservoir parameters representing properties of the reservoir, and determining a plurality of maximum horizontal stress values. The plurality of maximum horizontal stress values are determined from the reservoir parameters. The operations also include determining a fracability index associated with the reservoir at least one of the reservoir parameters, determining a brittleness index associated with the reservoir using the plurality of maximum horizontal stress values and at least one of the reservoir parameters, and identifying a fluid flow path using a shear stress, a normal stress, and a fracture aperture. The operations further include obtaining fracture injection data from a fracture injection test and determining the sweet spot for hydraulic fracturing stimulation based on the fracability index, the brittleness index, the fluid flow path, and the fracture injection data.

In some embodiments, the reservoir parameters representing properties of the reservoir include dynamic mechanical properties of the rock in the reservoir. In some embodiments, the dynamic mechanical properties include Young's Modulus and Poisson's ratio. In some embodiments, the reservoir parameters representing properties of the reservoir include static mechanical properties of the rock in the reservoir. In some embodiments, identifying a fluid flow path using a shear stress, a normal stress, and an aperture associated of a fracture includes determining the aperture of the fracture in the naturally fractured hydrocarbon reservoir using a resistivity, a drilling fluid resistivity, and an excess current measurement, determining a shear stress associated with the fracture, the shear stress determined from reservoir parameters representing properties of the hydrocarbon reservoir, and determining a normal stress associated with the fracture, the normal stress determined from reservoir parameters representing properties of the hydrocarbon reservoir, and identifying a fluid flow path using the shear stress, the normal stress, and the aperture. In some embodiments, the plurality of measurements include a compressional sonic log, a shear sonic log, and a density log.

In another embodiment, a system is provided for determining a sweet spot for hydraulic fracturing stimulation in a naturally fractured tight sand hydrocarbon reservoir. The system includes a processor and a non-transitory computer-readable memory accessible by the processor and having executable code stored thereon. The executable code includes a set of instructions that causes a processor to perform operations that include obtaining a plurality of measurements from one or more wells accessing the carbonate reservoir, determining reservoir parameters representing properties of the reservoir, and determining a plurality of maximum horizontal stress values. The plurality of maximum horizontal stress values are determined from the reservoir parameters. The operations also include determining a fracability index associated with the reservoir at least one of the reservoir parameters, determining a brittleness index associated with the reservoir using the plurality of maximum horizontal stress values and at least one of the reservoir parameters, and identifying a fluid flow path using a shear stress, a normal stress, and a fracture aperture. The operations further include obtaining fracture injection data from a fracture injection test and determining the sweet spot for hydraulic fracturing stimulation based on the fracability index, the brittleness index, the fluid flow path, and the fracture injection data.

In some embodiments, the reservoir parameters representing properties of the reservoir include dynamic mechanical properties of the rock in the reservoir. In some embodiments, the dynamic mechanical properties include Young's Modulus and Poisson's ratio. In some embodiments, the reservoir parameters representing properties of the reservoir include static mechanical properties of the rock in the reservoir. In some embodiments, identifying a fluid flow path using a shear stress, a normal stress, and an aperture associated of a fracture includes determining the aperture of the fracture in the naturally fractured hydrocarbon reservoir using a resistivity, a drilling fluid resistivity, and an excess current measurement, determining a shear stress associated with the fracture, the shear stress determined from reservoir parameters representing properties of the hydrocarbon reservoir, and determining a normal stress associated with the fracture, the normal stress determined from reservoir parameters representing properties of the hydrocarbon reservoir, and identifying a fluid flow path using the shear stress, the normal stress, and the aperture. In some embodiments, the plurality of measurements include a compressional sonic log, a shear sonic log, and a density log.

BRIEF DESCRIPTION OF THE DRAWINGS

The patent and application file contains at least one drawing executed in color. Copies of this patent or patent application publication with color drawing(s) will be provided by the Office upon request and payment of the necessary fee.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure are directed to determining sweet spot intervals for hydraulic fracturing in naturally fractured tight sand reservoirs in a formation. A process for determining sweet spot intervals may determining sweet spot interval using rock quality (as indicated by various properties), an in-situ stress regime, natural fractures, and identified fluid flow paths from the interaction of hydraulic fracturing and formation attributes.

Figure 1:
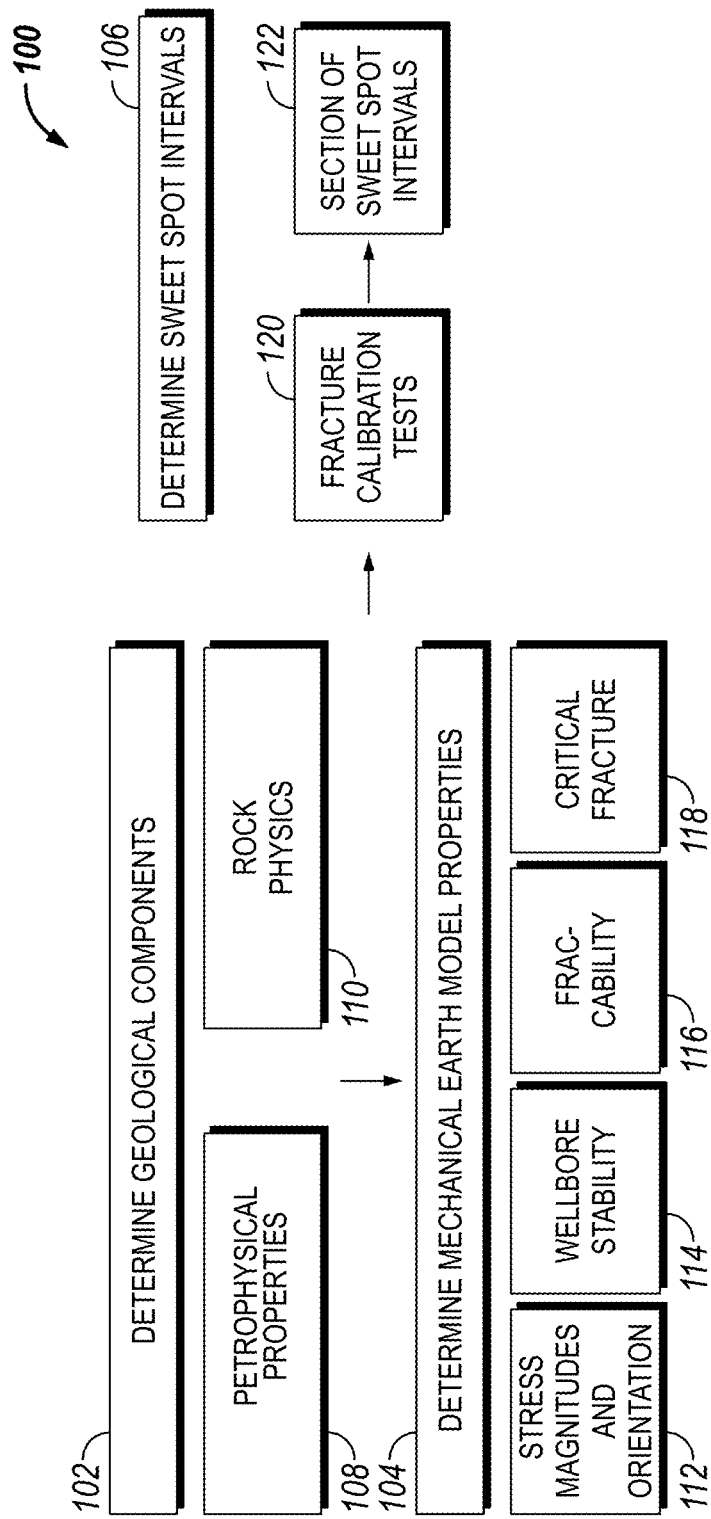
FIG. 1 is a flowchart of a process for determining sweet spots for hydraulic fracturing stimulation in naturally fractured tight sand reservoirs in accordance with an embodiment of the disclosure.

FIG. 1 depicts a process 100 for determining sweet spots for hydraulic fracturing stimulation in naturally fractured tight sand reservoirs in accordance with an embodiment of the disclosure. As shown in FIG. 1, the process 100 may include: 1) determining geological components (block 102); 2) determining mechanical earth model properties (block 104); and determining sweet spot intervals (block 106).

As also shown in FIG. 1, determining geological components may include determining petrophysical properties (block 108) and rock physics (block 110). Determining mechanical earth model properties may include determining stress magnitude and orientation (block 112), determining wellbore stability (block 114), determining fracability (block 116), and determining critical fractures (block 118). Determining sweet spot intervals may include performing fracture calibration tests (block 122) and selecting sweet spot intervals (block 124).

Figure 2:
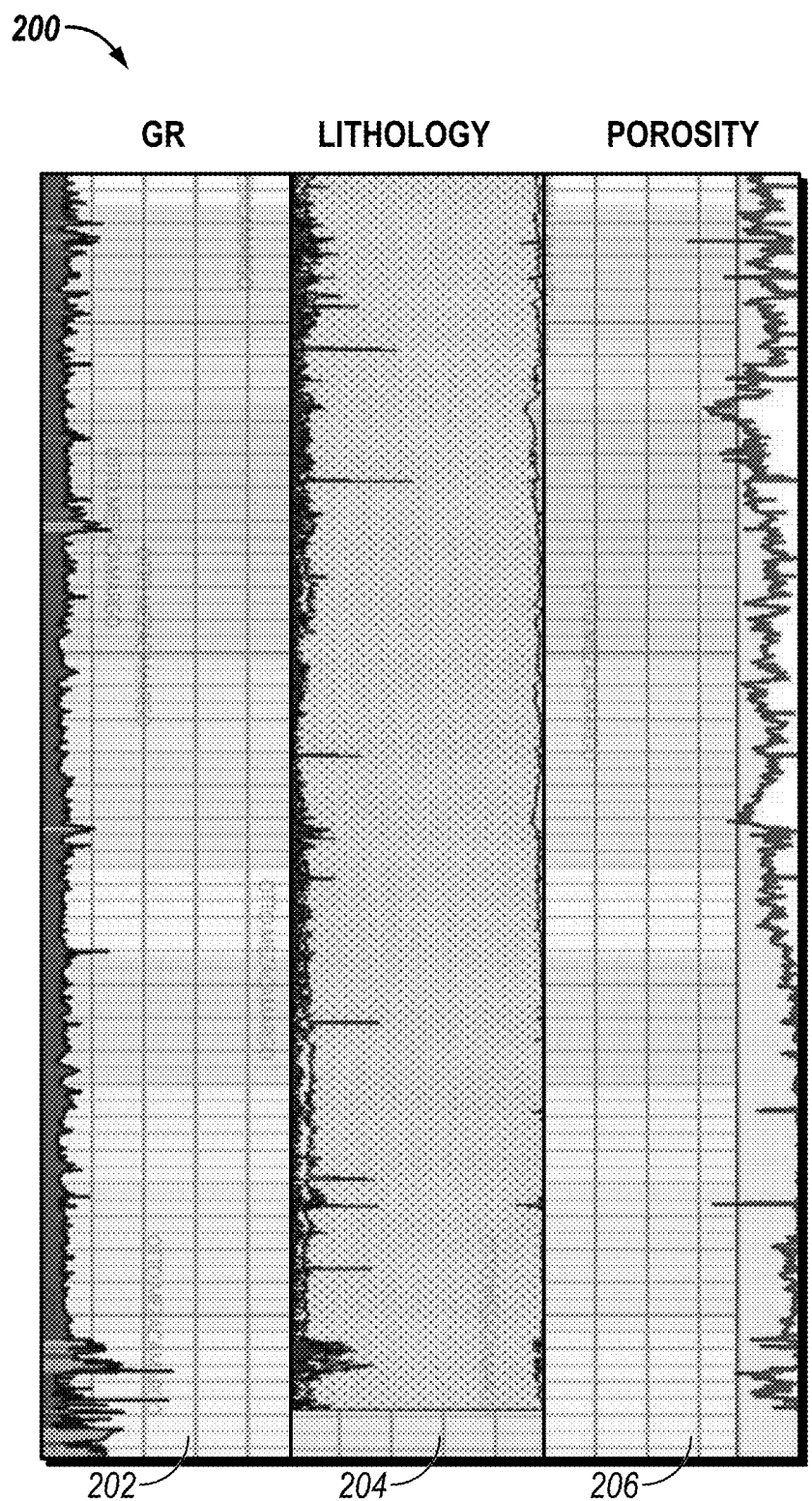
FIG. 2 is a composite log of gamma ray (Gr) measurements used to determine corresponding lithology measurements and porosity measurements in accordance with an embodiment of the disclosure.

The determination of petrophysical properties (block 106) may include determining porosity, mineral volume, permeability, water saturation, or any combination thereof. In some embodiments, these properties may be derived from known techniques for petrophysical interpretation. In some embodiments, the petrophysical properties may include rock quality, a parameter that combines sedimentology, diagenesis, and stratigraphic sequences as is known in the art. By way of example, FIG. 2 depicts a composite log 200 of gamma ray (Gr) measurements 202 used to determine corresponding lithology measurements 204 and porosity measurements 206 as known in the art.

Figure 3:
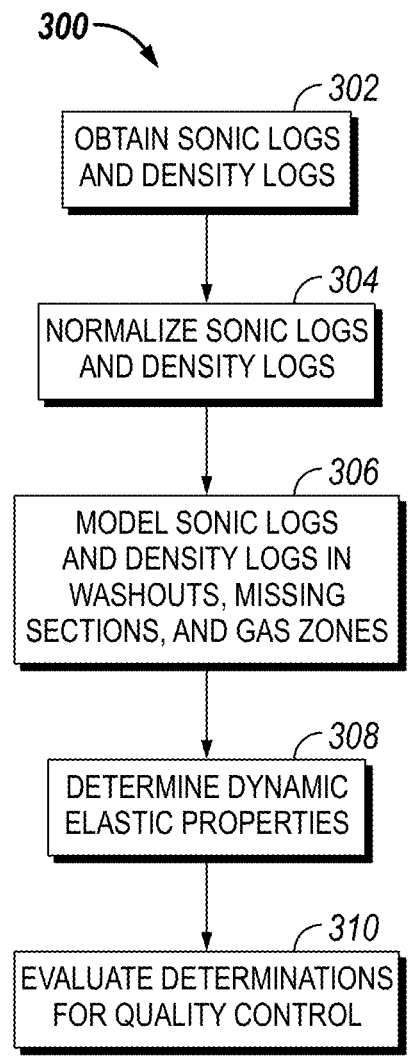
FIG. 3 is a flowchart of a process for correction of sonic logs in accordance with an embodiment of the disclosure.
Figure 4A:
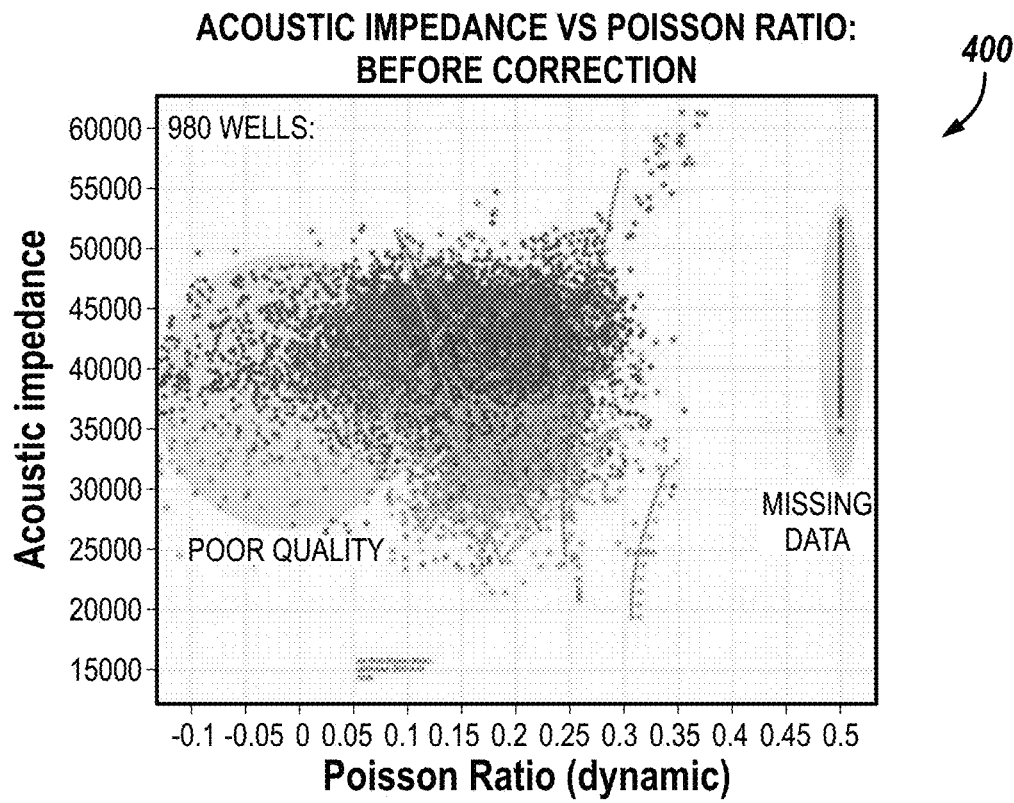
FIGS. 4A and 4B are plots of acoustic impedance vs. Poisson's Ratio in accordance with an embodiment of the disclosure.
Figure 4B:
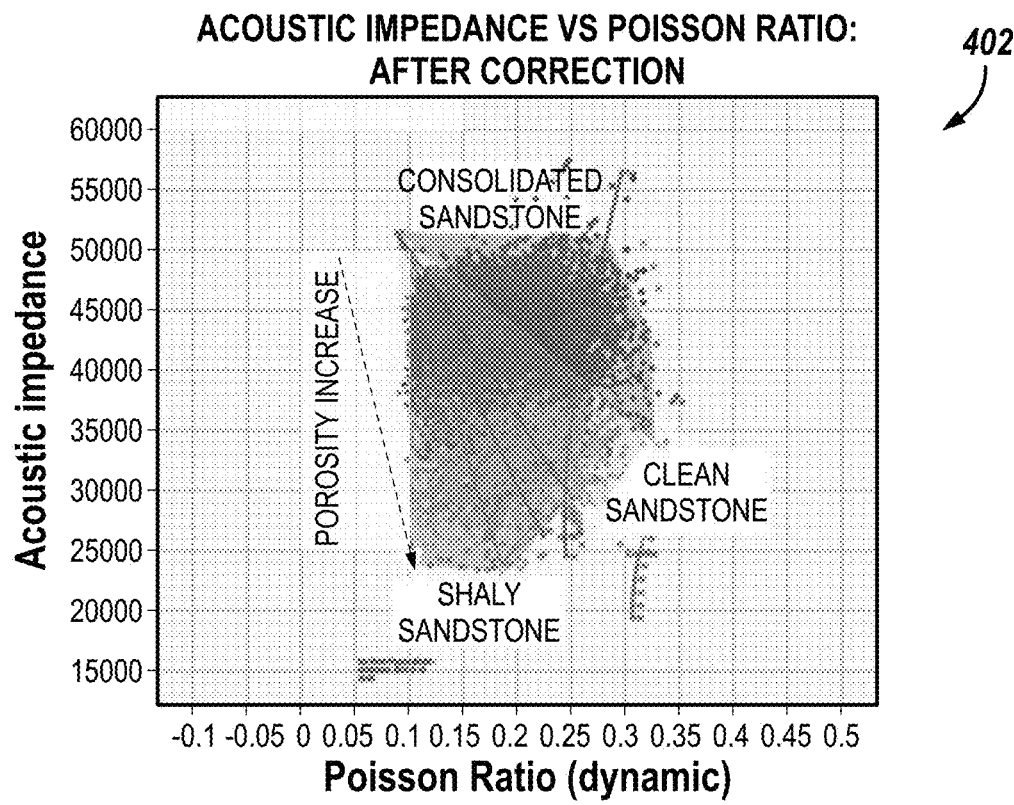

Additionally, rock physics may be determined (block 108) from the correction of a sonic acoustic well logs and bulk density logs. FIG. 3 depicts a process 300 for correction of sonic logs in accordance with an embodiment of the disclosure. The process may include obtaining well logs such as sonic logs and density logs (block 302) and normalizing the sonic logs and density logs (block 304) as is known in the art. The sonic logs and density logs may be modeled for washouts, missing sections, gas zones, and other conditions (block 306). Dynamic elastic properties may be determined from the logs (block 308). In some embodiments, the determined properties may be evaluated for quality control (block 310) against measured data or laboratory determinations. For example, FIGS. 4A and 4B depicts plots 400 and 402 of acoustic impedance vs. Poisson's Ratio in accordance with an embodiment of the disclosure. Plot 400 shows a plot of acoustic impedance vs Poisson's Ratio before correction, and plot 402 shows a plot of acoustic impedance vs Poisson's Ratio after correction.

In some embodiments, dynamic Young's Modulus, Shear Modulus, Bulk Modulus and Poisson's Ratio for reservoir rock can be generated using compressional sonic logs, shear sonic logs and density logs obtained from well logging tools. Well logs, such as bulk density logs and acoustic sonic logs, may be corrected due to the effects of hole condition such as borehole wall rugosity (that is, washouts) and natural gas in rocks. In some embodiments, a bulk density log may be reconstructed from logs of the mineral rock volumes, porosity, and mineral density. In some embodiments, acoustic sonic logs (that is, sonic log velocities) may be reconstructed using formation rock models.

The rock physics may be focused on predicting dynamic pressure wave velocity $V_p$ and shear wave velocity $V_s$ as accurately as possible, which is suitable for further mechanical modeling. By using the porosity and clay content from well logs, an analysis of which rock physics models are most suitable may be performed. Several techniques such as Advanced Differential Effective Medium (DEM) to estimate P-wave and S-wave velocities are available in Techlog™ 2017 platform suite available from Schlumberger Ltd of Houston, TX, USA. A tangential shear factor may be introduced to obtain optimal match with observed $V_p/V_s$ ratios in the sandstones, since contact theory is known to over predict shear wave velocities by neglecting rotational freedom and slip at grain contacts. $V_p$ and $V_s$ are functions of porosity, clay content, differential pressure, and saturation. The setup of input parameters may be completed iteratively to find the best solid clay properties to be used for this dataset; that is, inverting for solid clay elasticity for the dataset, assuming that all other properties are known, and the model is correct. Calculated $V_p$ and $V_s$ may be calibrated with dynamic mechanical properties derived from core analysis to obtain the best fit between all available data.

The rock physics model may be formed based on physical principles to generate P-wave and S-wave velocities based on rock structure, composition, and properties. By assigning known values to certain of these formation rock parameters, such as clay and sand bulk- and shear-modulus, model velocities can also be obtained in corrupted intervals. The main advantage of this approach is that all relation between elastic properties and rock quality are preserved.

In some embodiments, static properties may be determined using empirical correlations from triaxial rock mechanical tests. In such embodiments, relationships between the static Young's modulus and dynamic Young's modulus may be derived from the triaxial rock mechanical tests and compared with the properties determined from sonic well logs. For example, the tests of rock samples may include single or multi-stage tri-axial rock mechanical tests to provide data representing measures rock strength and mechanical conditions to simulate in-situ stress conditions providing compressive strength and static values of elastic constants of the rock.

Figure 5:
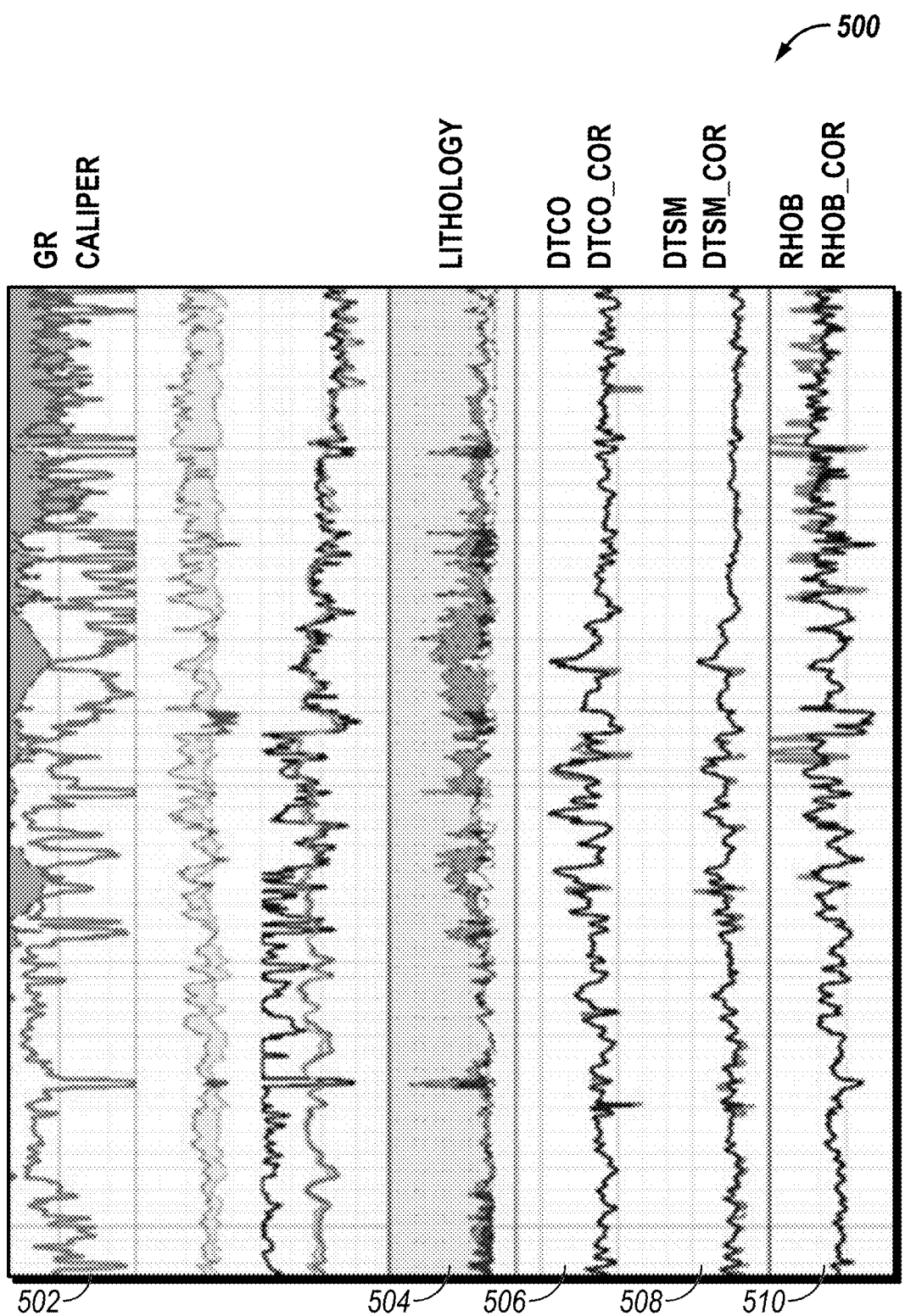
FIG. 5 is a composite log of mechanical properties as determined from sonic logs and as compared to properties determined from triaxial rock mechanical tests in accordance with an embodiment of the disclosure.

FIG. 5 depicts a composite log 500 showing various mechanical properties as determined from sonic logs and as compared to properties determined from triaxial rock mechanical tests in a laboratory in accordance with an embodiment of the disclosure. The composite log depicts gamma ray (Gr) and caliper measurements 502, lithology 504, delta time compressional (DTCO) and DTCO correlation 506, delta time shear (DTSM) and DTSM correlation 508, and bulk density (RHOB) and RHOB correlation 510.

As shown in FIG. 1, a mechanical earth model may be generated to determine various properties (block 104). In some embodiments, the mechanical earth model may be implemented according to the techniques described in U.S. patent application Ser. No. 16/792,742 filed Feb. 17, 2020, and titled "DETERMINATION OF CALIBRATED MINIMUM HORIZONTAL STRESS MAGNITUDE USING FRACTURE CLOSURE PRESSURE AND MULTIPLE MECHANICAL EARTH MODEL REALIZATIONS," now issued U.S. Pat. No. 11,098,582, a copy of which is incorporated by reference in its entirety.

Figure 6:
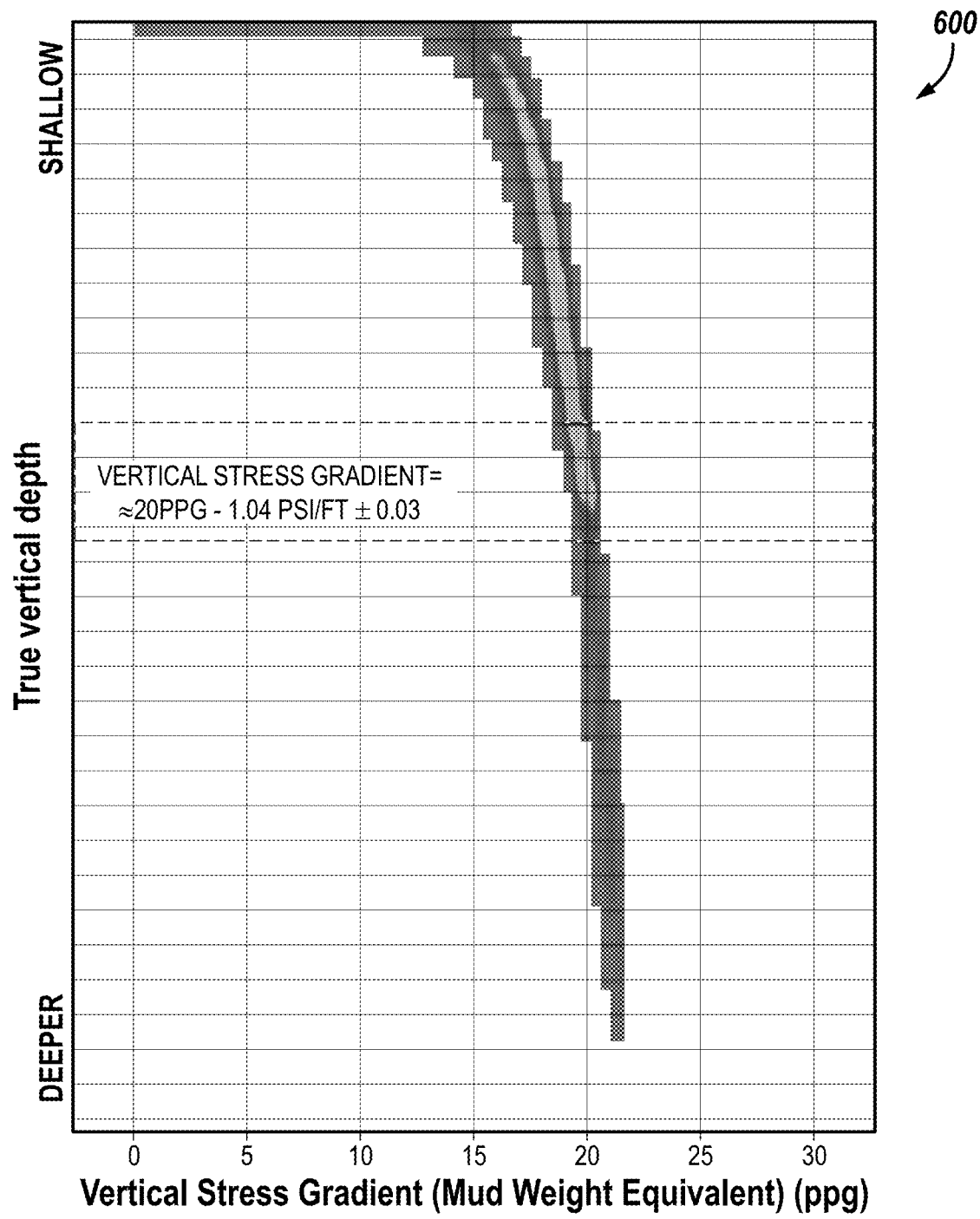
FIG. 6 is a plot of true vertical depth vs. vertical stress gradient (in mud weight equivalent of pounds per gallon (ppg)) that shows a vertical stress calculation in accordance with an embodiment of the disclosure.

Using the mechanical earth model, stress magnitude and orientation may be determined (block 110). In some embodiments, the vertical (also referred to as "overburden") stress may be determined using bulk density logs and a compaction lines technique. By way of example, FIG. 6 depicts a plot 600 of true vertical depth vs. vertical stress gradient (in mud weight equivalent of pounds per gallon (ppg)) that shows a vertical stress calculation using a compaction line and bulk density in accordance with an embodiment of the disclosure. As shown in the example depicted in FIG. 6, the vertical stress gradient is approximately 1.04 pounds per square inch (psi) per foot (ft).

Figure 7:
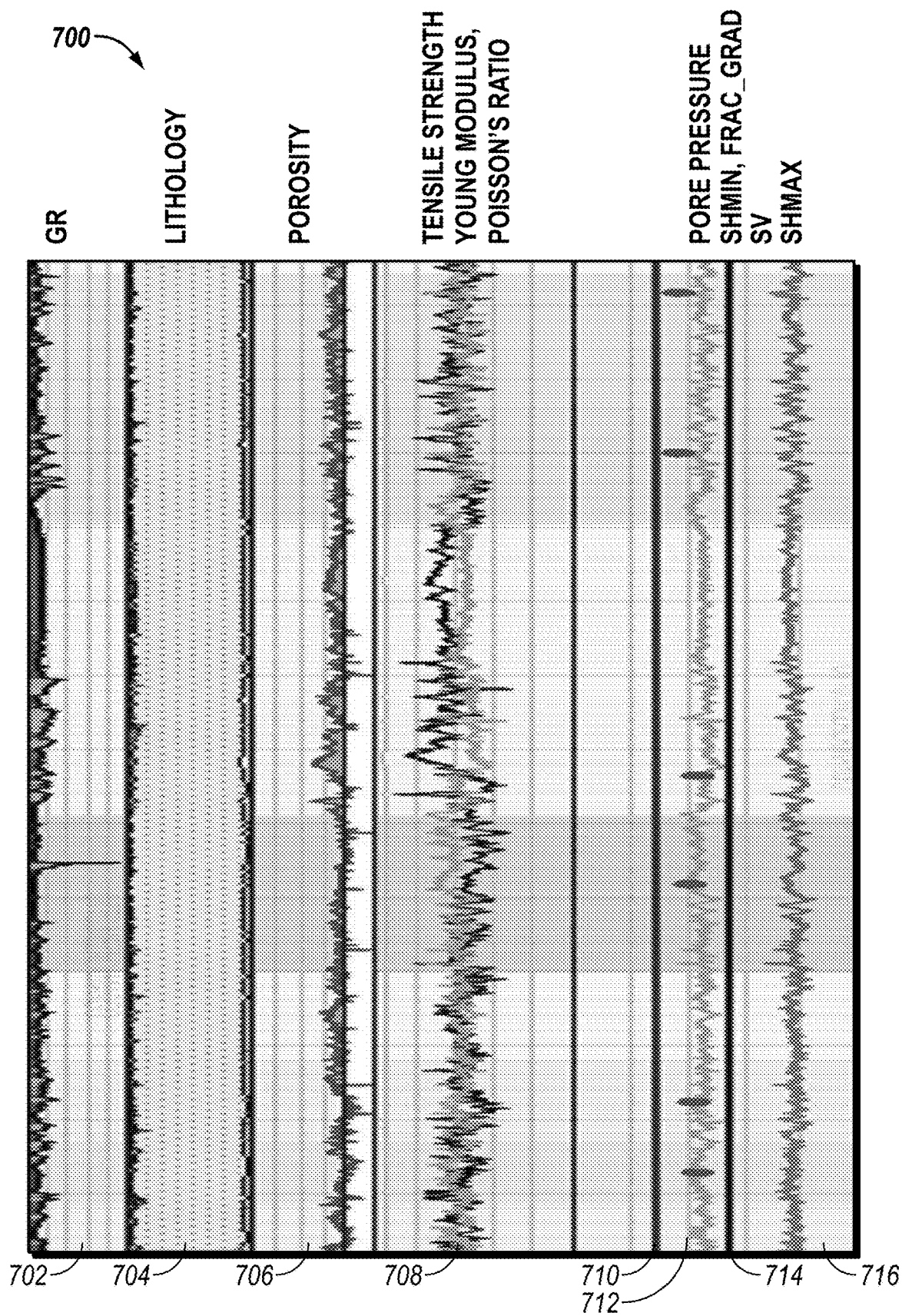
FIG. 7 is a composite image showing gamma ray (Gr) measurements, lithology, porosity, properties such as tensile strength, Young's Modulus, and Poisson's Ratio, pore pressure, minimum horizontal stress ($S_{hmin}$) with fracture gradients, vertical stress (Sw), and maximum horizontal stress ($S_{hmax}$), in accordance with an embodiment of the disclosure.

The minimum horizontal stress ($S_{hmin}$) may be calculated from fracture closure pressure (such as determined by a leak-off test (LOT)). By way of example, FIG. 7 is a composite 700 showing gamma ray (Gr) measurements (702), lithology (704), porosity (706), properties (708) such as tensile strength, Young's Modulus, and Poisson's Ratio, pore pressure (710), minimum horizontal stress ($S_{hmin}$) with fracture gradients (712), vertical stress ($S_v$) (714), and maximum horizontal stress ($S_{hmax}$) (716), in accordance with an embodiment of the disclosure. FIG. 7 depicts a consistent trend for the fracture closure pressure across the example well. In the example shown in FIG. 7, the minimum horizontal stress ($S_{hmin}$) is approximately 0.98 psi/ft pounds per square inch (psi) per foot (ft).

The maximum horizontal stress ($S_{Hmax}$) may be determined by assuming a strike-slip fault regime such that the maximum horizontal stress ($S_{Hmax}$) is the largest principal stress (that is, $S_{Hmax} > S_v > S_{hmin}$). The orientation of the maximum horizontal stress may be determined using wellbore failure analysis such as borehole breakouts and drilling-induced tensile fractures interpreted from a borehole image (BHI) log.

A minimum horizontal stress ($S_{hmin}$) and maximum horizontal stress ($S_{Hmax}$) profile may be determine using a poro-elastic and horizontal-strain stress approach, such that the minimum horizontal stresses and maximum horizontal stresses at each depth depend on the following factors: 1) mechanical properties; 2) pore pressure; and 3) vertical stress (overburden). The pore pressure may be determined from direct measurements using MDT (Modular Formation Dynamics) and Bottom Hole Static Pressure (BHSP) as known in the art. The maximum horizontal stress ($S_{Hmax}$) may also be constrained by using wellbore stability model and drilling events (for example, mud lost circulation, stuck pipes, in-flow, and tight hole). By way of example, the estimated gradient of maximum principal horizontal stress magnitude may be about 1.4 Psi/ft.

Figure 8:
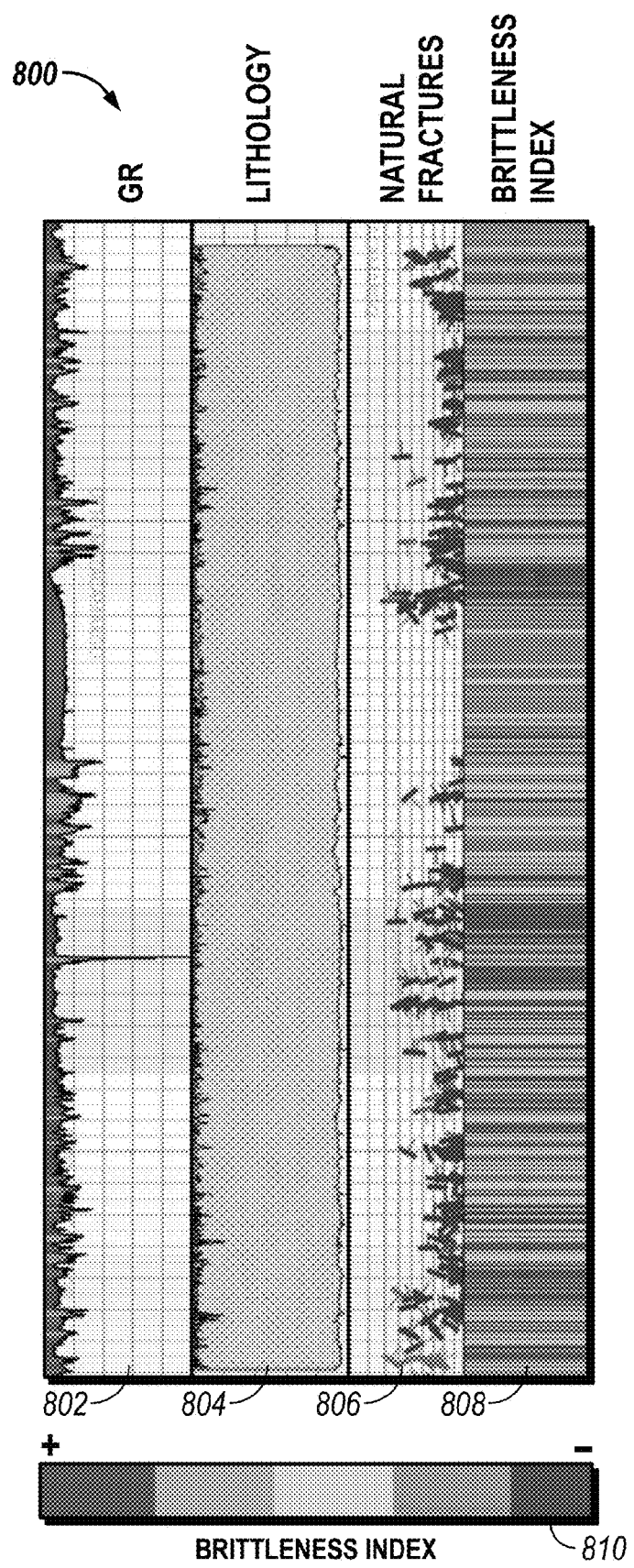
FIG. 8 is a composite image of gamma ray (GR) measurements, lithology, natural fractures, and a brittleness index color coded according to a legend in accordance with an embodiment of the disclosure.

The mechanical earth model may also include determination of a brittleness index (or property) from a brittleness index model. In some embodiments, the brittleness index may be determined by, such as by using one or more neuronal classification algorithms. In some embodiments, the neuronal classification algorithm may be provided in a geosciences platform such as the Techlog® Platform available from Schlumberger Limited of Houston, Texas, USA. As known in the art, the brittleness index is a discrete property, that may be determined from continuous properties such as Poisson's Ratio, Young's Modulus, Unconfined Compressional Strengths (UCS) and fracture gradient. FIG. 8 depicts a composite log 800 showing a comparison between brittleness index and fracture intensity in accordance with an embodiment of the disclosure. FIG. 8 depicts a composite image 800 of gamma ray (GR) measurements 802, lithology 804, natural fractures 806, and a brittleness index 808 color coded according to the legend 810 in accordance with an embodiment of the disclosure.

Figure 9:
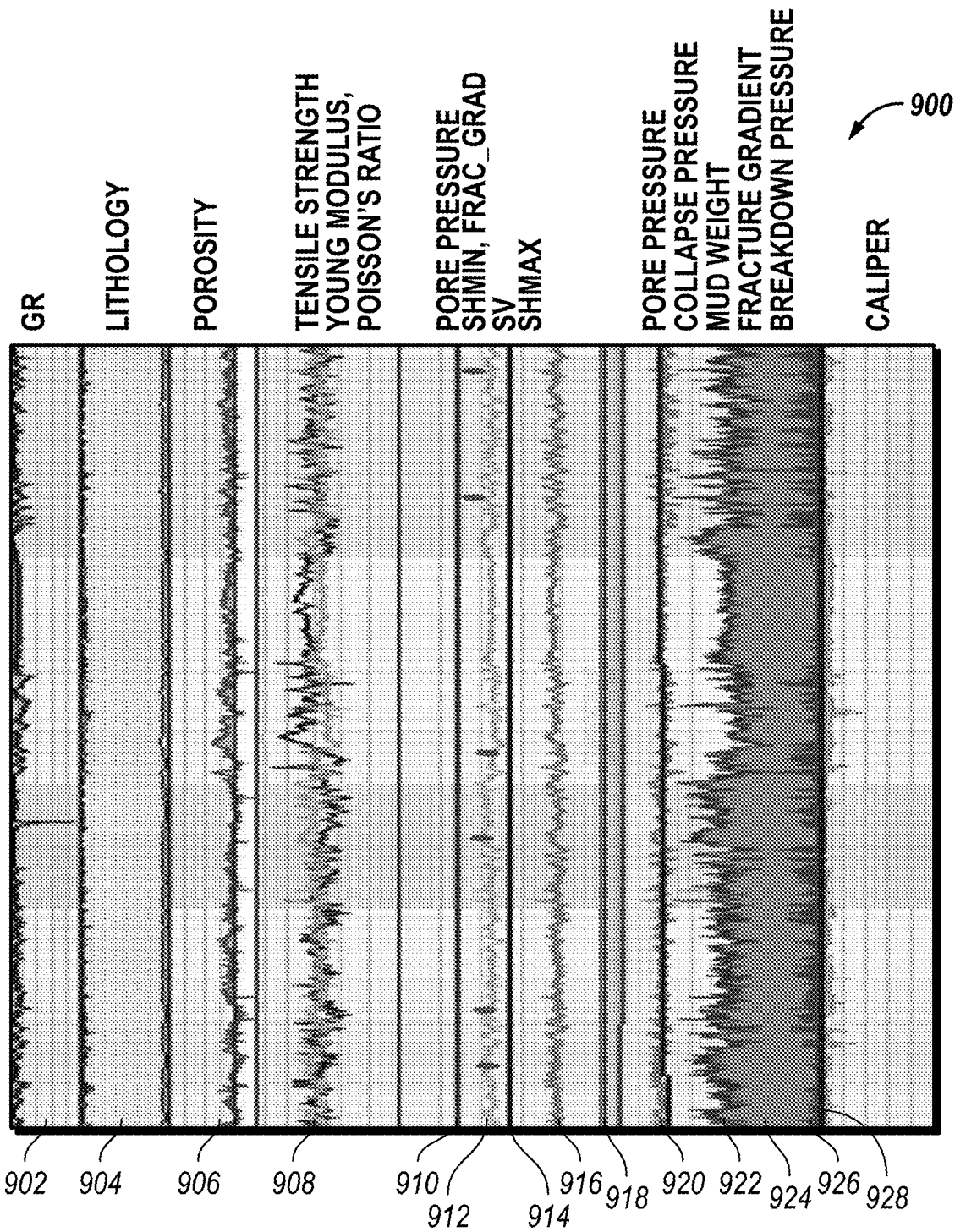
FIG. 9 is a composite image of stress profiles and wellbore stability in accordance with an embodiment of the disclosure.

Next, wellbore stability may be determined (block 112). In some embodiments, wellbore stability conditions may be evaluated through the qualitative and quantitative match using mechanical failures (such as breakouts and drilling tensile fractures) interpreted from the borehole image (BHI) log. The evaluation may capture the interaction between the drilling mud weight, breakout pressure, and breakdown pressure. FIG. 9 depicts a composite 900 showing the stress profiles and wellbore stability in accordance with an embodiment of the disclosure. The composite 900 of FIG. 9 includes gamma ray (Gr) measurements (902), lithology (904), porosity (906), properties (908) such as tensile strength, Young's Modulus, and Poisson's Ratio, pore pressure (910), minimum horizontal stress ($S_{hmin}$) with fracture gradients (912), vertical stress (S v) (914), maximum horizontal stress ($S_{hmax}$) (916), pore pressure (918), collapse pressure (920), mud weight (922), fracture gradient (924), breakdown pressure (926), and caliper measurements (928).

As also discussed infra, a fracability of a reservoir may be determined. In some embodiments, a fracability index may be determined from petrophysical and mechanical properties. The fracability index may identify intervals with optimal rock quality in terms of ease of performing hydraulic fracturing based on data such as porosity, minimum horizontal stress magnitude, stress ratio, volume of clay, and other data.

Figure 10:
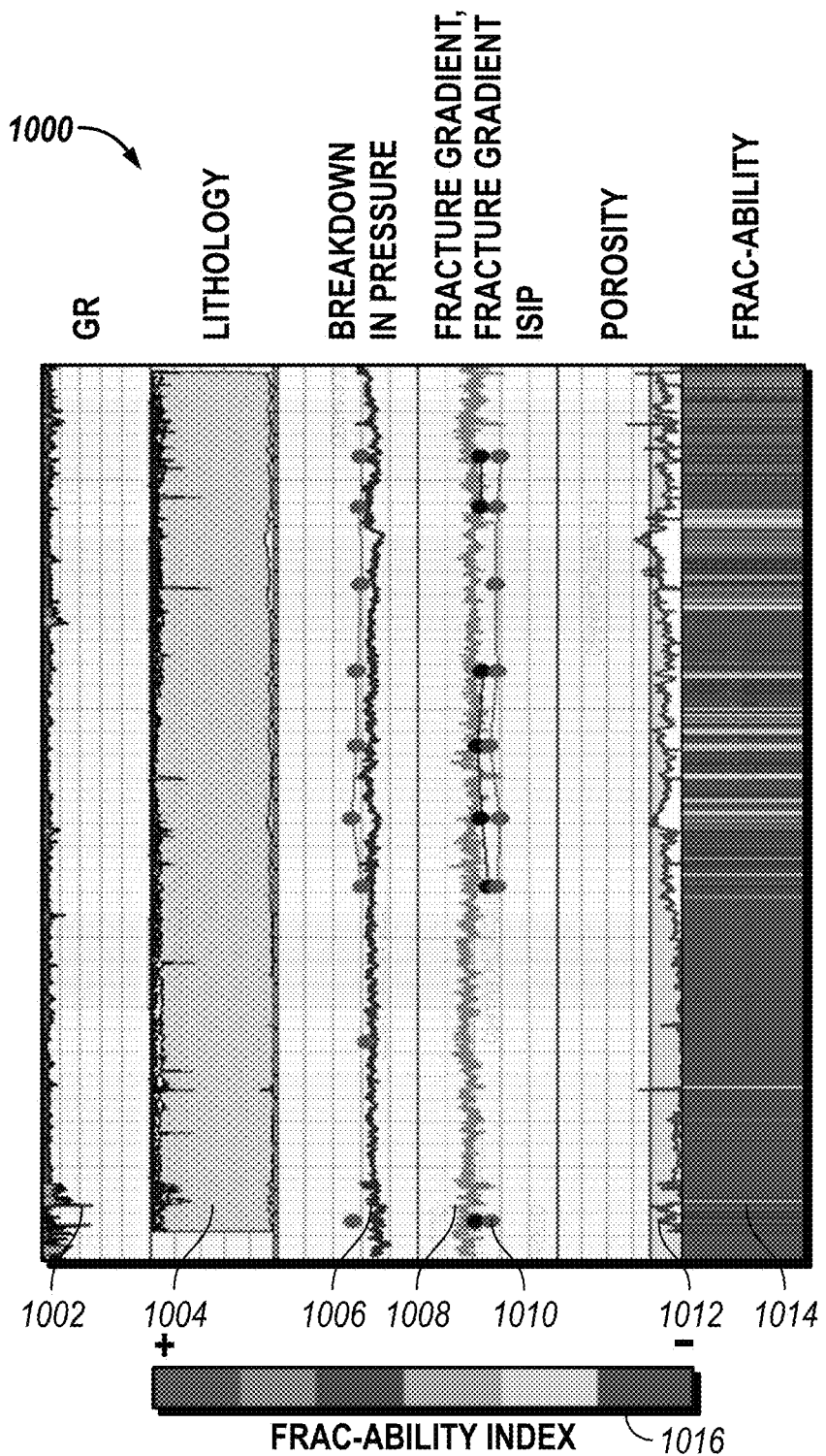
FIG. 10 is a composite image of a comparison between fracability index and various properties of a reservoir in accordance with an embodiment of the disclosure.

In some embodiments, the fracability index is a discrete property that may be discretized from the different petrophysical and mechanical properties, such as porosity, permeability, fracture gradient, and breakdown pressure, and by using one or more neuronal classification algorithms. In some embodiments, the neuronal classification algorithm may be provided in a geosciences platform such as the Techlog® Platform available from Schlumberger Limited of Houston, Texas, USA. FIG. 10 depicts a composite 1000 showing a comparison between fracability index and various properties of a reservoir in accordance with an embodiment of the disclosure. The composite 1000 of FIG. 10 depicts gamma ray (GR) measurements 1002, lithology 1004, breakdown pressure 1006, fracture gradient 1008, instantaneous shut-in pressure (ISIP) 1010, porosity 1012, and a brittleness index 1014 color coded according to the legend 1016.

Figure 11B:
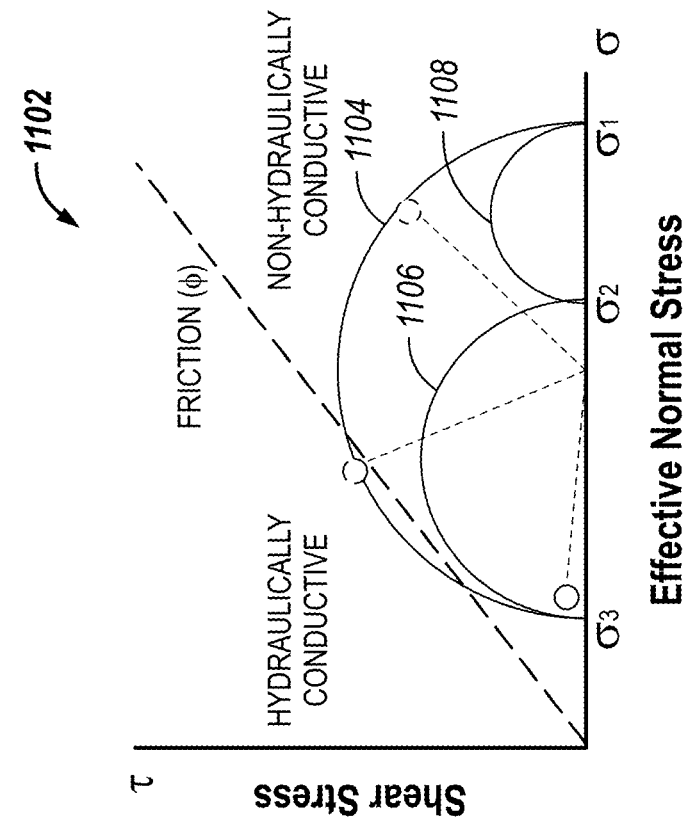
FIG. 11B is a plot of shear stress vs normal stress and coefficient of friction in accordance with an embodiment of the disclosure.
Figure 11A:
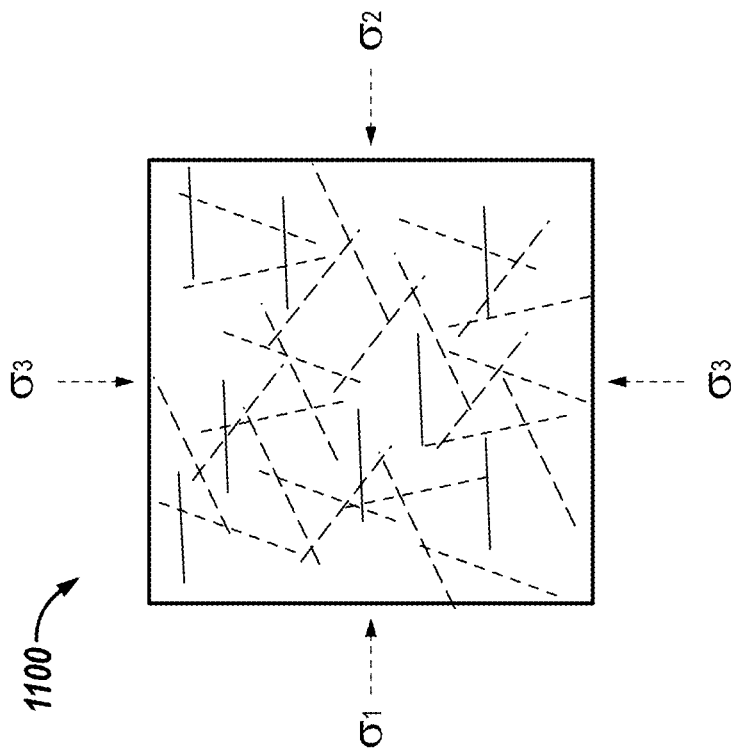
FIG. 11A is a diagram illustrating fluid flow paths for hydraulically conductive and non-hydraulically conductive fractures using normal stresses in accordance with an embodiment of the disclosure.

Next, critical fractures in the reservoir of interest may be determined (block 116). As will be appreciated, critical stress depends on the stress magnitude and the orientation of the fracture plane with respect to the in-situ stress orientation. The stress orientation affects the normal and shear stresses acting in the fracture plane. When normal and shear stress exceed the friction angle (for non-intact rock), the shearing may produce dilation that keeps the fracture hydraulically open. Fractures in this state may be referred to as "reactivated," "critically stressed," or as a "fluid flow path." FIG. 11A is a diagram 1100 illustrating fluid flow paths for hydraulically conductive and non-hydraulically conductive fractures using normal stresses ($\sigma_1$ and $\sigma_3$) in accordance with an embodiment of the disclosure. FIG. 11B is a plot 1102 of shear stress vs normal stress and coefficient of friction in accordance with an embodiment of the disclosure. FIG. 11B illustrates "Mohr circles" 1104, 1106, and 1108, as is known in the art.

Shear failure may be caused by two perpendicular stresses acting on the same plane, and is defined in conjunction with a Mohr circle by the following equation expressing stress conditions shown schematically in FIG. 11B:

$$\sigma1' > C0 + \sigma3' \tan 2\beta \tag{1}$$

Where C0 is the unconfined compressive strength, $\sigma1'$ is the maximum effective stress, $\sigma3'$ is the minimum effective stress, and $\beta$ is the angle between the normal stress and the maximum effective stress $\sigma1'$, such is $\beta$ is determined as follows:

$$\beta = 45° + \frac{\Phi}{2} \tag{2}$$

Where $\phi$ is the friction angle.

If the maximum effective stress $\sigma1'$ is exceeded, then the conditions for shear failure are satisfied.

In some embodiments, fluid flow paths may be identified according to the techniques described in U.S. patent application Ser. No. 17/476,914 filed Sep. 16, 2021, and titled "IDENTIFYING FLUID FLOW PATHS IN NATURALLY FRACTURED RESERVOIRS," a copy of which is incorporated by reference in its entirety. For example, in some embodiments normal effective stress and shear stress may be determined. In terms of stress tensor components $\sigma_{i,j}$ the normal stress may be defined as the product of stress vector multiplied by normal unit vector $\sigma_n = T^{(n)} \cdot n$ and the magnitude of the shear stress ($\tau_n$) component as defined in Equation 3:

$$\tau_n = \sqrt{(T^{(n)})^2 - \sigma_n} \tag{3}$$

A fluid flow path may be determined from shear stress and normal effective stress as shown in Equation 3:

$$\text{Fluid flow path} = (\tau - \sigma_n * \text{Tan}(\varphi)) \geq 0 \tag{4}$$

In some embodiments, fluid flow paths for a fracture network in a rock matrix may be identified by using determined apertures combined with the normal effective stress and shear stress. The largest aperture corresponds to the greatest distance between the points and the failure Mohr Coulomb line (that is, the friction angle for non-intact rock). In some embodiments, apertures may be determined from microresistivity logs calibrated microresistivity arrays, the fracture dataset, shallow resistivity, and drilling mud resistivity. The fracture aperture determination may be performed using Equation 1:

$$W = cA R_m^b R_{xo}^{1-b} \tag{5}$$

where W is the fracture width (that is, aperture), Rxo is the flushed zone resistivity, Rm is the mud resistivity, and A is the excess current flowing into the rock matrix through the conductive media due to the presence of the fracture. The excess current is a function of the fracture width and may be determined from statistical and geometrical analysis of the anomaly it creates as compared to background conductivity. For example, the excess current may be determined by dividing by voltage and integrating along a line perpendicular to the fracture trace. The term c is a constant and b is numerically obtained tool-specific parameter (that is, specific to the resistivity tools). As will be appreciated, a greater fracture aperture (W) indicates a more open fracture that is likely to flow hydrocarbons or other fluids, and a lesser fracture aperture indicates a fracture that will likely have reduced or low flow to hydrocarbons or other fluids.

The determined fracture aperture mean values may be provided in two forms: as sinusoids along fractures and as a secondary track with the mean value points. In addition to the mean fracture aperture, the hydraulic mean fracture aperture may be determined using Equation 2:

$$FVAH = \sqrt[3]{\frac{\sum (\text{length} \times \text{aperture}^3)}{\text{Total Length}}} \tag{6}$$

where FVAH is the hydraulic mean fracture aperture.

Figure 12:
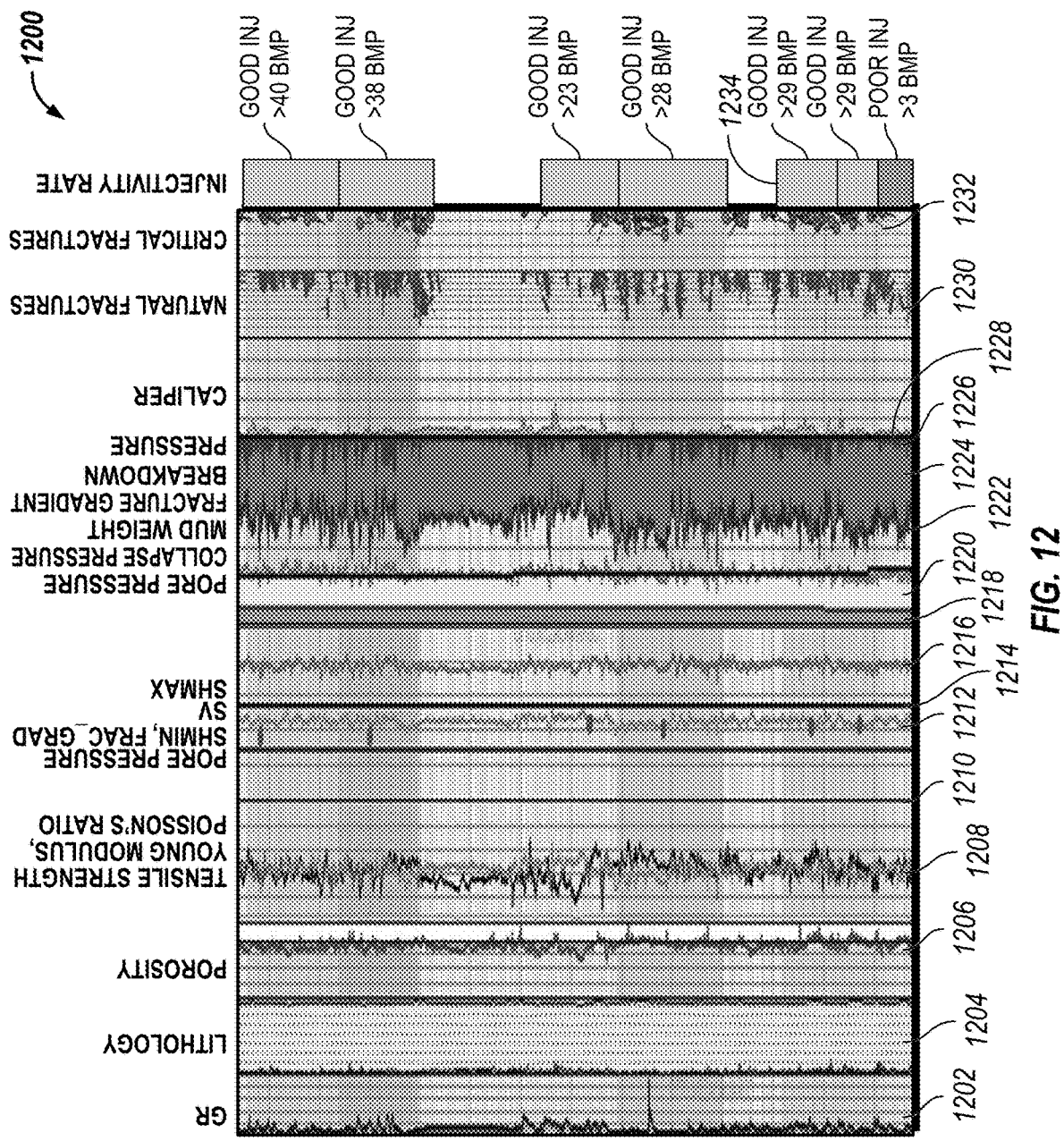
FIG. 12 is a composite image of measurements, properties, and combining natural fractures, critical fractures, and injectivity rate response in accordance with an embodiment of the disclosure.

By way of example, FIG. 12 depicts a composite 1200 depicting measurements, properties, and combining natural fractures, critical fractures, and injectivity rate response in accordance with an embodiment of the disclosure. The composite 1200 of FIG. 12 includes gamma ray (Gr) measurements (1202), lithology (1204), porosity (1206), properties (1208) such as tensile strength, Young's Modulus, and Poisson's Ratio, pore pressure (1210), minimum horizontal stress ($S_{hmin}$) with fracture gradients (1212), vertical stress (Sw) (1214), maximum horizontal stress ($S_{hmax}$) (1216), pore pressure (1218), collapse pressure (1220), mud weight (1222), fracture gradient (1224), breakdown pressure (1226), caliper measurements (1228), natural fractures 1230, critical fractures 1232, and injectivity rate 1234. The injectivity rate 1234 may be categorized based on barrels per minute (bpm), such that an injectivity rate above a rate threshold is considered a "good" injectivity rate and injectivity rate 1234 below a rate threshold is considered a "poor" injectivity rate.

Next, the sweet spot intervals may be determined (block 118). The sweet spot intervals for hydraulic fracturing stimulation may be determined using rock mechanical and petrophysical properties in combination with historical data from hydraulic fracturing jobs performed in the area. For example, such historical data may include fracture gradient, breakdown pressure, fluid injection volume, and reservoir quality parameters.

The determination and selection of sweet spot intervals may include performing one or more pre-main fracture calibration test to obtain additional data about the reservoir. In some embodiments, the pre-main fracture calibration test may include a diagnostic fracture injection test (DFIT). As used herein, a "diagnostic fracture injection test" (DFIT) may include a relatively small volume water pump-in treatment that provides data for designing hydraulic fracture stimulations and characterizing a reservoir. In accordance with embodiments of the disclosure, a diagnostic fracture injection test may be analyzed in two phases: i) before closure ("BC") and ii) after closure ("AC"). Such diagnostic fracture injection tests may provide the following data: reservoir pore pressure, detailed closure and fracture gradients, process zone stresses (PZS, or net pressure), and transmissibility values (which can be converted into reservoir permeability values and leak-off mechanisms). As will be appreciated, such diagnostic fracture injection tests may provide an equivalent of a traditional pressure transient test typically used in conventional reservoirs.

Figure 13:
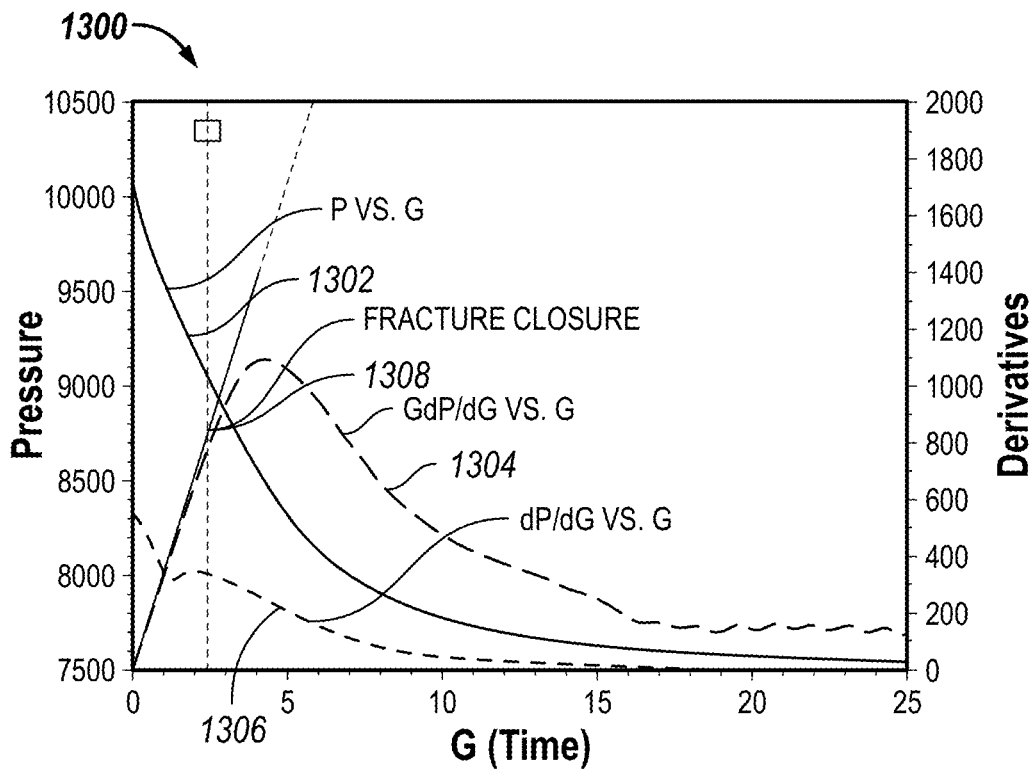
FIG. 13 is a plot of pressure vs G (dimensionless time) and illustrates a G-function for normal leak-off in accordance with an embodiment of the disclosure.

Conventional pressure decline analysis from a fracture injection is based on ideal rock conditions, that is an ideal hydraulic fracture developing in a perfectly linear-elastic, infinite, isotropic, homogeneous medium of constant permeability, pore pressure and closure stress. Under such assumptions, the fracture must be a single planar fracture adhering to the Perkins-Kern-Nordgren (PKN) geometry assumption of constant height, constant area, constant leak-off coefficient, and constant compliance. However, actual reservoirs rarely exist in these ideal conditions. Accordingly, in some embodiments, a pressure-dimensionless time function ("G-function") to analyze post injection pressure fall-off data from diagnostic fracture injection tests. FIG. 13 depicts a plot 1300 of pressure vs G (dimensionless time) and illustrates a G-function 1302 for normal leak-off in accordance with an embodiment of the disclosure. The plot 1300 also includes a derivative (dP/dG vs. G) graph 1304 and a G*dP/dG vs. G graph 1306 as is known the art. A fracture closure 1308 is also shown.

Figure 14:
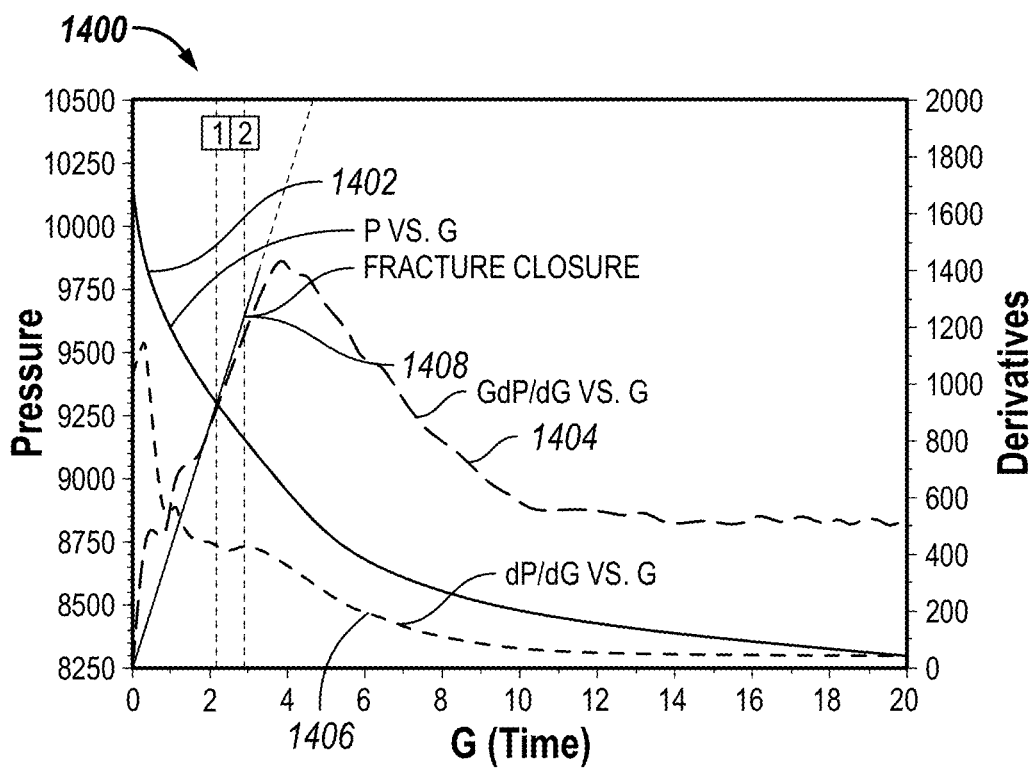
FIG. 14 depicts a plot of pressure vs G (dimensionless time) and illustrates a G-function plot for pressure dependent leak-off (PDL) in accordance with an embodiment of the disclosure.

In some instances, the non-linear behavior of the pressure fall-off of a G-function plot to an ideal fracture behavior may be the result of fracture geometry effects such as pressure dependent leak-off (PDL), fracture tip extension, fracture height recession, or existence of variable storage in a transverse fracture system. By way of example, FIG. 14 depicts a plot 1400 of pressure vs G (dimensionless time) and illustrates a G-function plot for PDL in accordance with an embodiment of the disclosure. The plot 1400 also includes a derivative (dP/dG vs. G) graph 1404 and a G*dP/dG vs. G graph 1406 as is known the art. A fracture closure 1408 is also shown.

Figure 15:
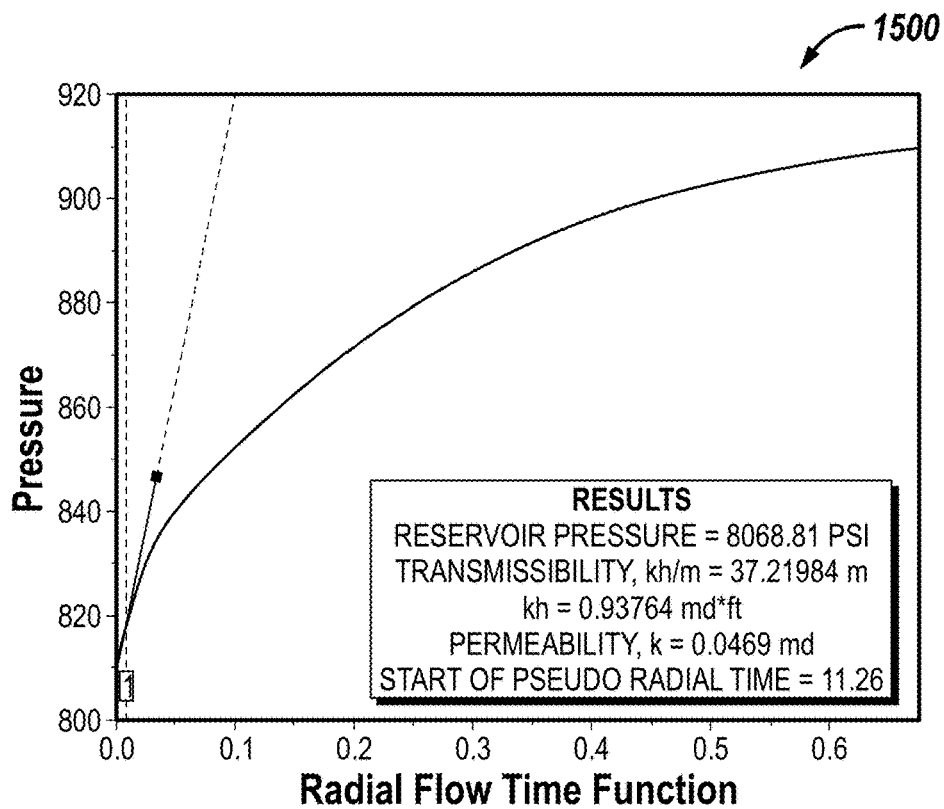
FIG. 15 is a Cartesian Radial Flow plot of pressure vs a radial time flow function on for a PDL after-closure analysis (ACA) in accordance with an embodiment of the disclosure.

In some embodiments, supplementary plots of the square root of shut-in time and the log-log of pressure changes (and, in some instances, their derivatives) may be used to obtain consistent fracture closure time and stress, as well as the identification of transient flow regimes. The accurate identification of transient flow regimes may be used to perform an after-closure analysis (ACA). If a pseudo-radial flow regime is identified then a Cartesian Radial Flow plot or a conventional Horner plot may be used to determine far-field reservoir transmissibility as kh/µ, where µ is the far-field fluid viscosity, h is the estimated net pay height, and k the effective reservoir permeability. For example, FIG. 15 depicts a Cartesian Radial Flow plot 1500 of pressure on the y-axis and a radial time flow function on the x-axis for a PDL ACA in accordance with an embodiment of the disclosure. In the example, shown in FIG. 15, the far-field reservoir transmissibility is determined as kh/µ=37.21984.

Figure 16:
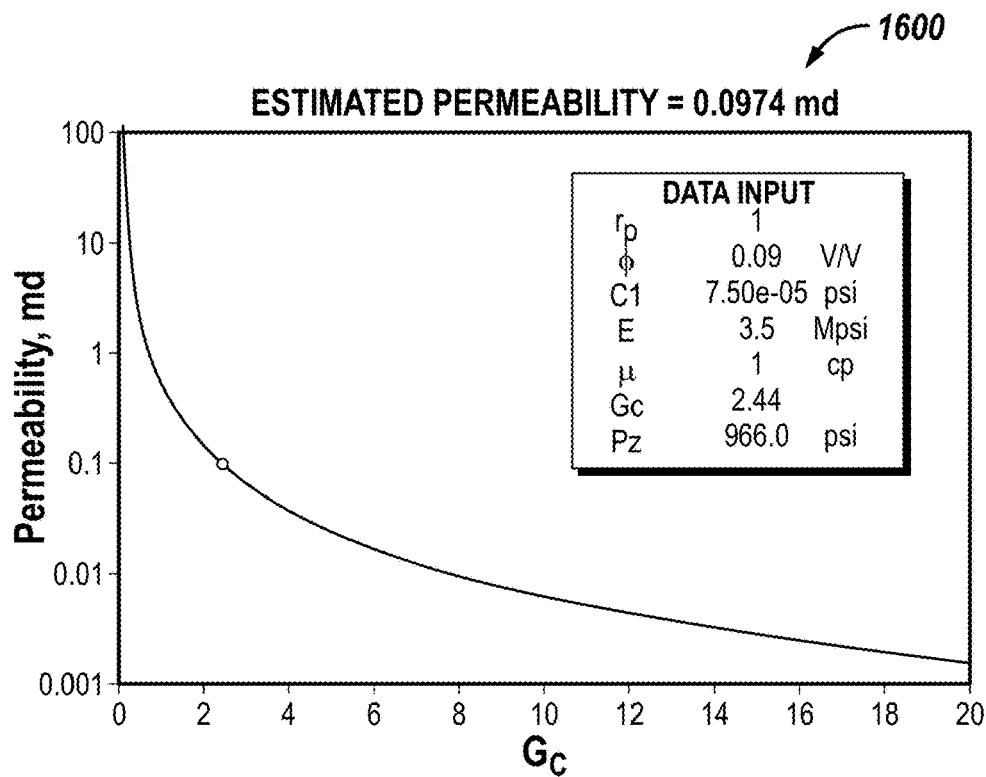
FIG. 16 is a plot of permeability vs a G-function of dimensionless time for an estimate of normal leak-off permeability in accordance with an embodiment of the disclosure.

In other embodiments, a pseudo-radial flow regime may not be achieved but some estimate of reservoir permeability may still be desired. In such embodiments, reservoir permeability may be determined from an empirical correlation developed from G-function closure time through numerical simulations of fracture closure. For example, FIG. 16 depicts a plot 1600 of permeability vs a G-function of dimensionless time for an estimate of normal leak-off permeability in accordance with an embodiment of the disclosure.

As discussed herein, such fracture calibration tests may also be used to generate a more realistic description of a complex reservoir environment. For example, the magnitude and transient behavior of the net pressure(s), and friction pressure(s) may be attributed to non-ideal behaviors including poro-elastic effects, (for example, tight rock), multiple fracturing events, near wellbore tortuosity, wellbore trajectory, fracture re-orientation while fracturing, presence of natural fractures, changes in rock lithology, in-situ stresses, damaged zone, and other behaviors. Advantageously, the use of this integrated approach may resolve reservoir complexities and assist in determining sweet spots.

Sweet spots (also referred to as "sweet spot intervals") may be selected for hydraulic fracturing stimulation using the fracability index, brittleness index, and the identified fluid flow paths from the critical stress determinations.

Figure 17:
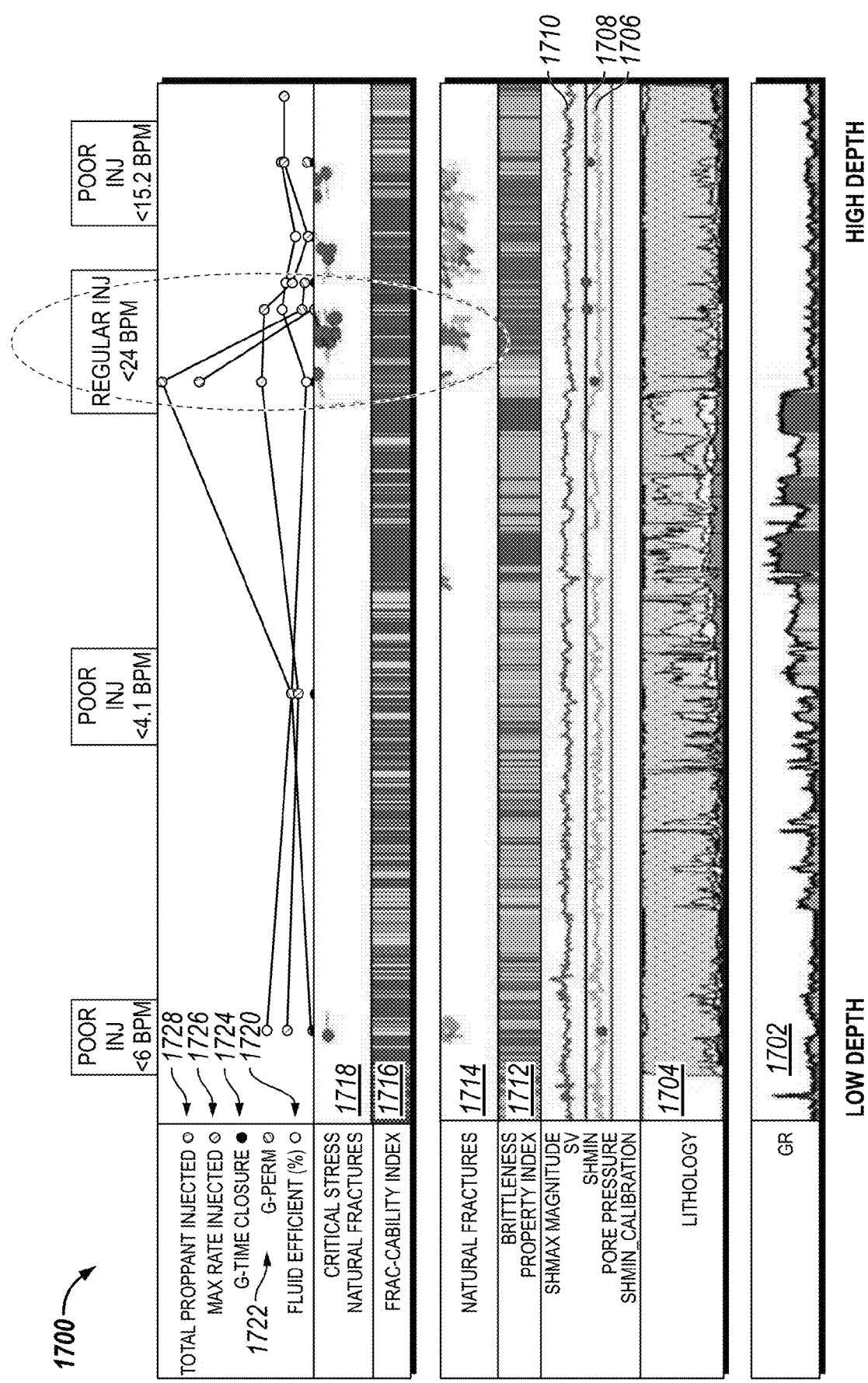
FIG. 17 is a composite illustrating the correlation between the geomechanically derived parameters and fracture treatment response as determined from the permeability derived from a G-function plot, the fracturing pump rate and the total proppant injected in the presence of identified fluid flow paths, in accordance with an embodiment of the disclosure.

The techniques described in the disclosure illustrate a significant correlation between the geomechanically derived parameters and fracture treatment response as determined from the permeability derived from a G-function plot, the fracturing pump rate and the total proppant injected in the presence of identified fluid flow paths. FIG. 17 depicts a composite 1700 illustrating the correlation 1702. The composite 1700 includes gamma ray (Gr) measurements (1702), lithology (1704), minimum horizontal stress ($S_{hmin}$) with calibration points (1706), vertical stress ($S_v$) (1708), maximum horizontal stress ($S_{hmax}$) (1710), brittleness index (1712), natural fractures (1714), fracability index (1716), critical stress natural fractures (1718) fluid efficiency (1720), permeability derived from the G-function plot (G-perm) (1722), G-time closure (1724), maximum rate injected (1726), and total proppant injected (1728). As shown in FIG. 17, the correlation 1702 related to an injectivity rate of up to 24 bpm as well other suitable parameters that together indicate a sweet spot interval for hydraulic fracturing stimulation. For example, the fracability index may indicate the best intervals for intact rock, as defined by the red color shown in FIG. 10 and FIG. 17. Additionally, red colors defined for brittleness index may indicate the best intervals for natural fractures as shown in FIG. 8 and FIG. 17. The presence of fluid-flow paths in such intervals may further determine the best intervals to be stimulated.

Figure 18:
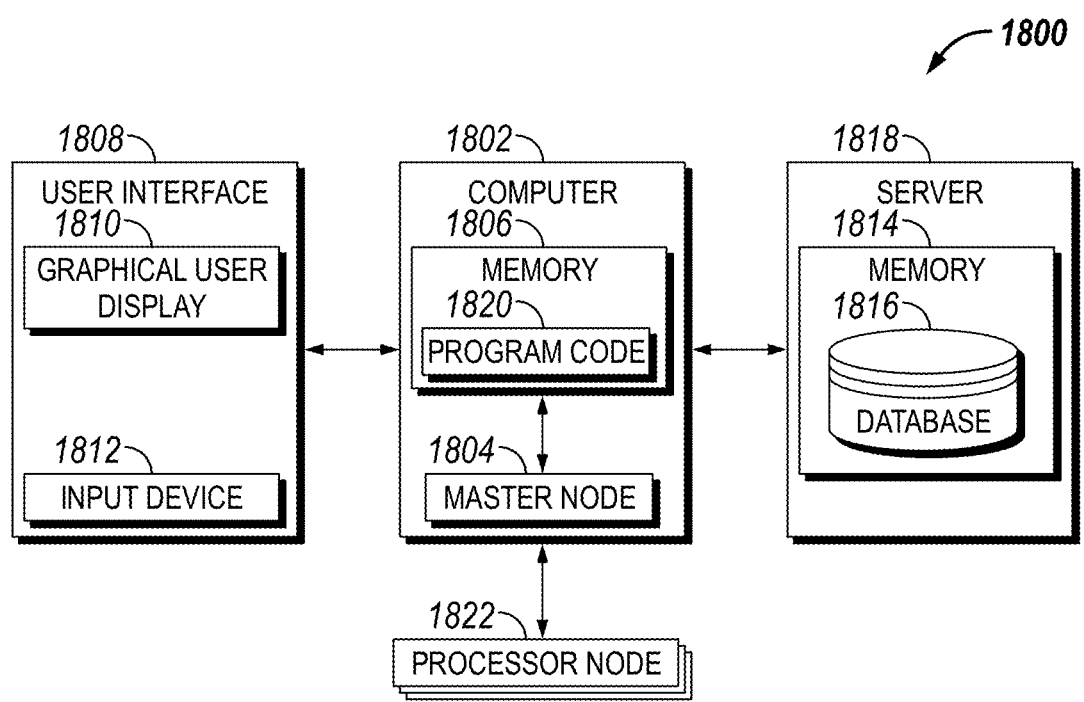
FIG. 18 is a block diagram of a data processing system that includes a computer having a master node processor and memory coupled to the processor in accordance with an embodiment of the disclosure.

FIG. 18 depicts a data processing system 1800 that includes a computer 1802 having a master node processor 1804 and memory 1806 coupled to the processor 1804 to store operating instructions, control information and database records therein in accordance with an embodiment of the disclosure. The data processing system 1800 may be a multicore processor with nodes such as those from Intel Corporation or Advanced Micro Devices (AMD), or an HPC Linux cluster computer. The data processing system 1800 may also be a mainframe computer of any conventional type of suitable processing capacity such as those available from International Business Machines (IBM) of Armonk, N.Y., or other source. The data processing system 1800 may in cases also be a computer of any conventional type of suitable processing capacity, such as a personal computer, laptop computer, or any other suitable processing apparatus. It should thus be understood that a number of commercially available data processing systems and types of computers may be used for this purpose The computer 1802 is accessible to operators or users through user interface 1808 and are available for displaying output data or records of processing results obtained according to the present disclosure with an output graphic user display 1810. The output display 1810 includes components such as a printer and an output display screen capable of providing printed output information or visible displays in the form of graphs, data sheets, graphical images, data plots and the like as output records or images.

The user interface 1808 of computer 1802 also includes a suitable user input device or input/output control unit 1812 to provide a user access to control or access information and database records and operate the computer 1802. Data processing system 1800 further includes a database of data stored in computer memory, which may be internal memory 1806, or an external, networked, or non-networked memory as indicated at 1814 in an associated database 1816 in a server 1818.

The data processing system 1800 includes executable code 1820 stored in non-transitory memory 224 of the computer 1802. The executable code 1820 according to the present disclosure is in the form of computer operable instructions causing the data processor 1804 to determine geomechanical components, determine a mechanical earth model, vertical stress, maximum horizontal stress, minimum horizontal stress, shear stress, normal stress, identify fluid flow paths, determine G-functions, and enable the determination of sweet spot intervals according to the present disclosure in the manner set forth.

It should be noted that executable code 1820 may be in the form of microcode, programs, routines, or symbolic computer operable languages capable of providing a specific set of ordered operations controlling the functioning of the data processing system 1800 and direct its operation. The instructions of executable code 1820 may be stored in memory 1806 of the data processing system 1800, or on computer diskette, magnetic tape, conventional hard disk drive, electronic read-only memory, optical storage device, or other appropriate data storage device having a non-transitory computer readable storage medium stored thereon. Executable code 1820 may also be contained on a data storage device such as server 1818 as a non-transitory computer readable storage medium, as shown.

The data processing system 1800 may be include a single CPU, or a computer cluster as shown in FIG. 18, including computer memory and other hardware to make it possible to manipulate data and obtain output data from input data. A cluster is a collection of computers, referred to as nodes, connected via a network. A cluster may have one or two head nodes or master nodes 1804 used to synchronize the activities of the other nodes, referred to as processing nodes 1822. The processing nodes 1822 each execute the same computer program and work independently on different segments of the grid which represents the reservoir.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for determining a sweet spot for hydraulic fracturing stimulation in a naturally fractured tight sand hydrocarbon reservoir, the method comprising:
   obtaining a plurality of measurements from one or more wells accessing the carbonate reservoir;
   determining reservoir parameters representing properties of the reservoir;
   determining a plurality of maximum horizontal stress values, the plurality of maximum horizontal stress values determined from the reservoir parameters;
   determining a fracability index associated with the reservoir using at least one of the reservoir parameters;
   determining a brittleness index associated with the reservoir using the plurality of maximum horizontal stress values and at least one of the reservoir parameters;
   identifying a fluid flow path using a shear stress, a normal stress, and an aperture of a fracture, wherein identifying a fluid flow path using a shear stress, a normal stress, and an aperture of a fracture comprises determining the aperture of the fracture in the naturally fractured hydrocarbon reservoir using a resistivity, a drilling fluid resistivity, and an excess current measurement;
   obtaining fracture injection data from a diagnostic fracture injection test;
   determining the sweet spot for hydraulic fracturing stimulation based on the fracability index, the brittleness index, the fluid flow path, and the fracture injection data; and
   performing a hydraulic fracturing stimulation operation based on the determined sweet spot.

2. The method of claim 1, wherein the reservoir parameters representing properties of the reservoir comprise dynamic mechanical properties of the rock in the reservoir.

3. The method of claim 2, wherein the dynamic mechanical properties comprise Young's Modulus and Poisson's ratio.

4. The method of claim 1, wherein the reservoir parameters representing properties of the reservoir comprise static mechanical properties of the rock in the reservoir.

5. The method of claim 1, wherein identifying a fluid flow path using a shear stress, a normal stress, and an aperture associated of a fracture comprises:
   determining a shear stress associated with the fracture, the shear stress determined from reservoir parameters representing properties of the reservoir;
   determining a normal stress associated with the fracture, the normal stress determined from reservoir parameters representing properties of the reservoir; and
   identifying a fluid flow path using the shear stress, the normal stress, and the aperture.

6. The method of claim 1, wherein the plurality of measurements comprises a compressional sonic log, a shear sonic log, and a density log.

7. The method of claim 1, comprising performing a fracture injection test.

8. A non-transitory computer-readable storage medium having executable code stored thereon for determining a sweet spot for hydraulic fracturing stimulation in a naturally fractured tight sand hydrocarbon reservoir, the executable code comprising a set of instructions that causes a processor to perform operations comprising:
- obtaining a plurality of measurements from one or more wells accessing the carbonate reservoir;
- determining reservoir parameters representing properties of the reservoir;
- determining a plurality of maximum horizontal stress values, the plurality of maximum horizontal stress values determined from the reservoir parameters;
- determining a fracability index associated with the reservoir using at least one of the reservoir parameters;
- determining a brittleness index associated with the reservoir using the plurality of maximum horizontal stress values and at least one of the reservoir parameters;
- identifying a fluid flow path using a shear stress, a normal stress, and an aperture of a fracture, wherein identifying a fluid flow path using a shear stress, a normal stress, and an aperture of a fracture comprises determining the aperture of the fracture in the naturally fractured hydrocarbon reservoir using a resistivity, a drilling fluid resistivity, and an excess current measurement;
- obtaining fracture injection data from a diagnostic fracture injection test;
- determining the sweet spot for hydraulic fracturing stimulation based on the fracability index, the brittleness index, the fluid flow path, and the fracture injection data; and
- performing a hydraulic fracturing stimulation operation based on the determined sweet spot.

9. The non-transitory computer-readable storage medium of claim 8, wherein the reservoir parameters representing properties of the reservoir comprise dynamic mechanical properties of the rock in the reservoir.

10. The non-transitory computer-readable storage medium of claim 9, wherein the dynamic mechanical properties comprise Young's Modulus and Poisson's ratio.

11. The non-transitory computer-readable storage medium of claim 8, wherein the reservoir parameters representing properties of the reservoir comprise static mechanical properties of the rock in the reservoir.

12. The non-transitory computer-readable storage medium of claim 8, wherein identifying a fluid flow path using a shear stress, a normal stress, and an aperture associated of a fracture comprises:
- determining a shear stress associated with the fracture, the shear stress determined from reservoir parameters representing properties of the reservoir;
- determining a normal stress associated with the fracture, the normal stress determined from reservoir parameters representing properties of the reservoir; and
- identifying a fluid flow path using the shear stress, the normal stress, and the aperture.

13. The non-transitory computer-readable storage medium of claim 8, wherein the plurality of measurements comprises a compressional sonic log, a shear sonic log, and a density log.

14. A system for determining a sweet spot for hydraulic fracturing stimulation in a naturally fractured tight sand hydrocarbon reservoir, comprising:
- a processor;
- a non-transitory computer-readable memory accessible by the processor and having executable code stored thereon, the executable code comprising a set of instructions that causes a processor to perform operations comprising:
  - obtaining a plurality of measurements from one or more wells accessing the carbonate reservoir;
  - determining reservoir parameters representing properties of the reservoir;
  - determining a plurality of maximum horizontal stress values, the plurality of maximum horizontal stress values determined from the reservoir parameters;
  - determining a fracability index associated with the reservoir using at least one of the reservoir parameters;
  - determining a brittleness index associated with the reservoir using the plurality of maximum horizontal stress values and at least one of the reservoir parameters;
  - identifying a fluid flow path using a shear stress, a normal stress, and an aperture of a fracture, wherein identifying a fluid flow path using a shear stress, a normal stress, and an aperture of a fracture comprises determining the aperture of the fracture in the naturally fractured hydrocarbon reservoir using a resistivity, a drilling fluid resistivity, and an excess current measurement;
  - obtaining fracture injection data from a diagnostic fracture injection test; and
  - determining the sweet spot for hydraulic fracturing stimulation based on the fracability index, the brittleness index, the fluid flow path, and the fracture injection data; and
  - performing a hydraulic fracturing stimulation operation based on the determined sweet spot.

15. The system of claim 14, wherein the reservoir parameters representing properties of the hydrocarbon reservoir comprise dynamic mechanical properties of the rock in the reservoir.

16. The system of claim 15, wherein the dynamic mechanical properties comprise Young's Modulus and Poisson's ratio.

17. The system of claim 14, wherein the reservoir parameters representing properties of the hydrocarbon reservoir comprise static mechanical properties of the rock in the reservoir.

18. The system of claim 14, wherein identifying a fluid flow path using a shear stress, a normal stress, and an aperture associated of a fracture comprises:
- determining a shear stress associated with the fracture, the shear stress determined from reservoir parameters representing properties of the hydrocarbon reservoir;
- determining a normal stress associated with the fracture, the normal stress determined from reservoir parameters representing properties of the hydrocarbon reservoir; and
- identifying a fluid flow path using the shear stress, the normal stress, and the aperture.

19. The system of claim 14, wherein the plurality of measurements comprise a compressional sonic log, a shear sonic log, and a density log.

* * * * *